United States Patent
Bian et al.

(10) Patent No.: US 10,726,543 B2
(45) Date of Patent: Jul. 28, 2020

(54) FLUORESCENT PENETRANT INSPECTION SYSTEM AND METHOD

(71) Applicant: General Electric Company, Schenectady, NY (US)

(72) Inventors: Xiao Bian, Niskayuna, NY (US); Steeves Bouchard, Bromont (CA); David Cantin, Bromont (CA); Stephane Harel, Bromont (CA); John Karigiannis, Bromont (CA); David Scott Diwinsky, West Chester, OH (US); Bernard Bewlay, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 86 days.

(21) Appl. No.: 16/201,480

(22) Filed: Nov. 27, 2018

(65) Prior Publication Data
US 2020/0167905 A1 May 28, 2020

(51) Int. Cl.
*G06T 7/00* (2017.01)
*B25J 9/16* (2006.01)
*G06K 9/62* (2006.01)

(52) U.S. Cl.
CPC ............. *G06T 7/001* (2013.01); *B25J 9/1697* (2013.01); *G06K 9/6284* (2013.01); *G06T 2207/10064* (2013.01); *G06T 2207/20084* (2013.01)

(58) Field of Classification Search
CPC ................................ G06T 7/001; G06T 7/004
See application file for complete search history.

(56) References Cited

U.S. PATENT DOCUMENTS

| 6,701,615 B2 | 3/2004 | Harding et al. |
| 7,215,807 B2 | 5/2007 | Nomoto et al. |

(Continued)

FOREIGN PATENT DOCUMENTS

| CN | 202471613 U | 10/2012 |
| CN | 206696197 U | 12/2017 |

(Continued)

OTHER PUBLICATIONS

Tang et al. "Automated Inspection System for Detecting Metal Surface Cracks from Fluorescent Penetrant Images" Machine Vision Applications in Industrial Inspection III; vol. 2423; Mar. 1995 (15 pages).

(Continued)

*Primary Examiner* — Tuan H Nguyen
(74) *Attorney, Agent, or Firm* — The Small Patent Law Group LLC; Philip S. Hof

(57) ABSTRACT

An inspection system includes one or more processors that obtain a first image of a work piece that has a fluorescent dye thereon in an ultraviolet (UV) light setting and a second image of the work piece in a visible light setting. The first and second images are generated by one or more imaging devices in the same position relative to the work piece. The one or more processors identify a candidate region of the first image based on a light characteristic of one or more pixels, and determine a corresponding candidate region of the second image that is at an analogous location as the candidate region of the first image. The one or more processors analyze both candidate regions to detect a potential defect on a surface of the work piece and a location of the potential defect relative to the surface of the work piece.

21 Claims, 5 Drawing Sheets

(56) References Cited

U.S. PATENT DOCUMENTS

| | | |
|---|---|---|
| 7,689,003 B2 | 3/2010 | Shannon et al. |
| 8,866,891 B2 | 10/2014 | Derrien et al. |
| 9,020,878 B2 | 4/2015 | Kush et al. |
| 9,921,132 B2 | 3/2018 | Nissen et al. |
| 10,054,552 B1 | 8/2018 | Frutuoso et al. |
| 10,060,857 B1 | 8/2018 | Bouchard et al. |
| 10,082,387 B2 | 9/2018 | Bergren et al. |
| 2006/0186260 A1 | 8/2006 | Magnuson et al. |
| 2017/0356849 A1 | 12/2017 | Henderkott |

FOREIGN PATENT DOCUMENTS

| | | | |
|---|---|---|---|
| CN | 106328228 B | 2/2018 | |
| EP | 2891878 A1 | 7/2015 | |
| EP | 3399466 A1 | 11/2018 | |
| JP | 2007017376 * | 1/2007 | ............. G01N 21/91 |
| JP | 4618501 B2 | 1/2011 | |
| WO | 2014184337 A1 | 11/2014 | |
| WO | 2017221024 A1 | 12/2017 | |

OTHER PUBLICATIONS

Zheng et al. "Design of an Advanced Automatic Inspection System for Aircraft Parts based on Fluorescent Penetrant Inspection Analysis"; Insight—Non-Destructive Testing and Condition Monitoring; vol. 57, No. 1; Jan. 2015 (8 pages).

Domaschke et al. "Robot Guided White Light Interferometry for Crack Inspection on Airplane Engine Components" 41st International Symposium on Robotics; 2014 (7 pages).

Fuente et al. "Development and Demonstration of an Automated System for Limited Access Weld Inspections by Using Infrared Active Thermogoraphy" 7th International Symposium on NDT in Aerospace; 2015 (8 pages).

U.S. Appl. No. 15/814,965, filed Nov. 16, 2017 (75 pages).

Extended European Search Report for corresponding EP Application No. 19206682.7-1230 dated May 13, 2020.

\* cited by examiner

FLUORESCENT PENETRANT INSPECTION SYSTEM AND METHOD

FIELD

The subject matter described herein relates to inspection of work pieces using fluorescence to detect defects.

BACKGROUND

Fluorescent penetrant indication (FPI) inspection utilizes a fluorescent dye applied onto a non-porous surface of a work piece. After removing a bulk of the dye from the surface, illuminating the surface in ultraviolet radiation in a dark room causes residual amounts of the dye within discontinuities of the work piece to emit a fluorescent glow that contrasts with the dark background, indicating the presence of the discontinuities. Each discontinuity may be a defect in the surface of the work piece, such as a crack, a chip, micro shrinkage, or spalling (e.g., flaking). The current protocol for FPI inspection is purely manual. For example, an inspector sits in a dark room or tent and manipulates an ultraviolet light source and/or a work piece to illuminate the work piece with ultraviolet light. Upon initial detection of a potential defect on the work piece, the inspector may brush or wipe the work piece to remove any dust and/or debris or other surface contamination that could represent a false positive. Then the inspector views the work piece under the ultraviolet light for a second time to determine the presence or absence of any defects on the surface of the work piece. If the inspector determines that the work piece has one or more defects, the inspector may designate the work piece for repair or may discard (e.g., scrap) the work piece.

The current manual process of FPI inspection is subjective and inconsistent. For example, the process is subject to the inherent human bias and/or error of the particular inspector performing the inspection. Although there may be adopted guidelines or rules for the inspectors to follow when determining whether to pass a work piece as satisfactory, send the work piece for repair, or discard the work piece, two different inspectors may apply the guidelines differently based on bias and/or error. It is possible that one inspector may decide to discard (e.g., scrap or dispose) a work piece that another inspector in a similar circumstance would decide to pass or to repair.

Beyond classifying specific work pieces for immediate use, repair, or disposal, there may only be a limited amount of information, if any, collected and recorded during the current process for FPI inspection. Without collecting and recording sufficient information about the defects detected, such information cannot be studied and analyzed for improving quality control and consistency of FPI inspections.

Furthermore, the current manual process for FPI inspection is inefficient and also uncomfortable for the inspector. For example, it may be uncomfortable and/or undesirable for the inspector to spend extended periods of time in a dark room or tent manipulating an ultraviolet light source and/or work pieces covered in a dye to inspect the work pieces.

SUMMARY

In one or more embodiments, an inspection system is provided that includes one or more processors configured to obtain a first image of a work piece that has a fluorescent dye thereon in an ultraviolet (UV) light setting and a second image of the work piece in a visible light setting. The work piece is illuminated with an ultraviolet light in the UV light setting to cause the fluorescent dye to emit light, and the work piece is illuminated with a visible light in the visible light setting to cause the work piece to reflect light. The first and second images are generated by one or more imaging devices in the same position relative to the work piece. The one or more processors are configured to identify a candidate region of the first image based on a light characteristic of one or more pixels within the candidate region, and to determine a corresponding candidate region of the second image that is at an analogous location as the candidate region of the first image. The one or more processors are configured to analyze both the candidate region of the first image and the corresponding candidate region of the second image to detect a potential defect on a surface of the work piece and a location of the potential defect relative to the surface of the work piece.

In one or more embodiments, a method is provided that includes obtaining a first image of a work piece that has a fluorescent dye thereon in an ultraviolet (UV) light setting in which the work piece is illuminated with an ultraviolet light to cause the fluorescent dye to emit light. The method includes obtaining a second image of the work piece in a visible light setting in which the work piece is illuminated by a visible light to cause the work piece to reflect light. The first and second images are generated by one or more imaging devices in the same position relative to the work piece. The method also includes identifying a candidate region of the first image based on a light characteristic of one or more pixels within the candidate region, and determining a corresponding candidate region of the second image that is at an analogous location as the candidate region of the first image. The method also includes analyzing, via one or more processors, both the candidate region of the first image and the corresponding candidate region of the second image to detect a potential defect on a surface of the work piece and a location of the potential defect relative to the surface of the work piece.

In one or more embodiments, an inspection system is provided that includes one or more processors configured to obtain a first image of a work piece in an ultraviolet (UV) light setting and a second image of the work piece in a visible light setting. The work piece has a fluorescent dye thereon. The first and second images are generated by one or more imaging devices in the same position relative to the work piece. The one or more processors are configured to identify a candidate region of the first image based on a light characteristic of one or more pixels within the candidate region, and to input the candidate region of the first image into a first branch of a dual branch neural network. The one or more processors are also configured to input a corresponding candidate region of the second image, at an analogous location as the candidate region of the first image, into a second branch of the dual branch neural network to examine the candidate regions in a forward propagation direction through layers of artificial neurons of the dual branch neural network. The one or more processors detect a potential defect in a surface of the work piece depicted in the candidate regions based on an output of the dual branch neural network.

BRIEF DESCRIPTION OF THE DRAWINGS

The present inventive subject matter will be better understood from reading the following description of non-limiting embodiments, with reference to the attached drawings, wherein below.

DETAILED DESCRIPTION

The embodiments described herein provide an inspection system and method for performing fluorescent penetrant indication (FPI) inspection of a work piece with improved efficiency and consistency over known FPI inspection techniques that are primarily manual. For example, the embodiments of the inspection system and method disclosed herein may be fully automated or at least semi-automated. The embodiments may automatically measure and record various information about the inspection settings and the discovered defects in the work pieces that create an objective track record and can be used for improving quality, consistency, manufacturing, and design.

The inspection system and method may include one or more image capturing devices, one or more light sources, one or more robotic arms, and one or more processors for inspecting work pieces. The system may generate image data depicting the work pieces, which may be rotor blades of a rotor assembly. The system performs FPI inspection, including automated bleed back operation, of the work pieces using deep learning algorithms. At least one technical effect of the inspection system and method described herein is improved efficiency and consistency over primarily manual FPI inspection techniques.

According to one or more embodiments, the inspection system and method acquire image data of a work piece under different lighting conditions. For example, one of the lighting conditions is an ultraviolet (UV) light setting. The work piece has a fluorescent dye thereon which emits a fluorescent glow in response to absorbing ultraviolet radiation. The image data may be mapped to a computer design model of the work piece to orient and align features captured in the two-dimensional image data with corresponding physical features of the three-dimensional work piece. The image data under the different lighting conditions is analyzed to detect the presence of defects, such as cracks, spalling, chipping, or the like, along the surface of the work piece. In at least one embodiment a deep learning based artificial neural network is trained to analyze the image data under different lighting conditions to identify potential defects in the work piece. For example, the artificial neural network may automatically integrate visible light-based image data and UV light-based image data to infer the probability that the surface region of interest of the work piece depicted in the image data has an FPI-type defect. The inspection system and method may automatically record various information, such as properties of the light settings, characteristics of the detected defects (e.g., location, size and dimension, shape, type, etc.), characteristics of the work piece, inspection results (e.g., pass, repair, or discard), and the like, in a computer-readable storage device.

Figure 1:
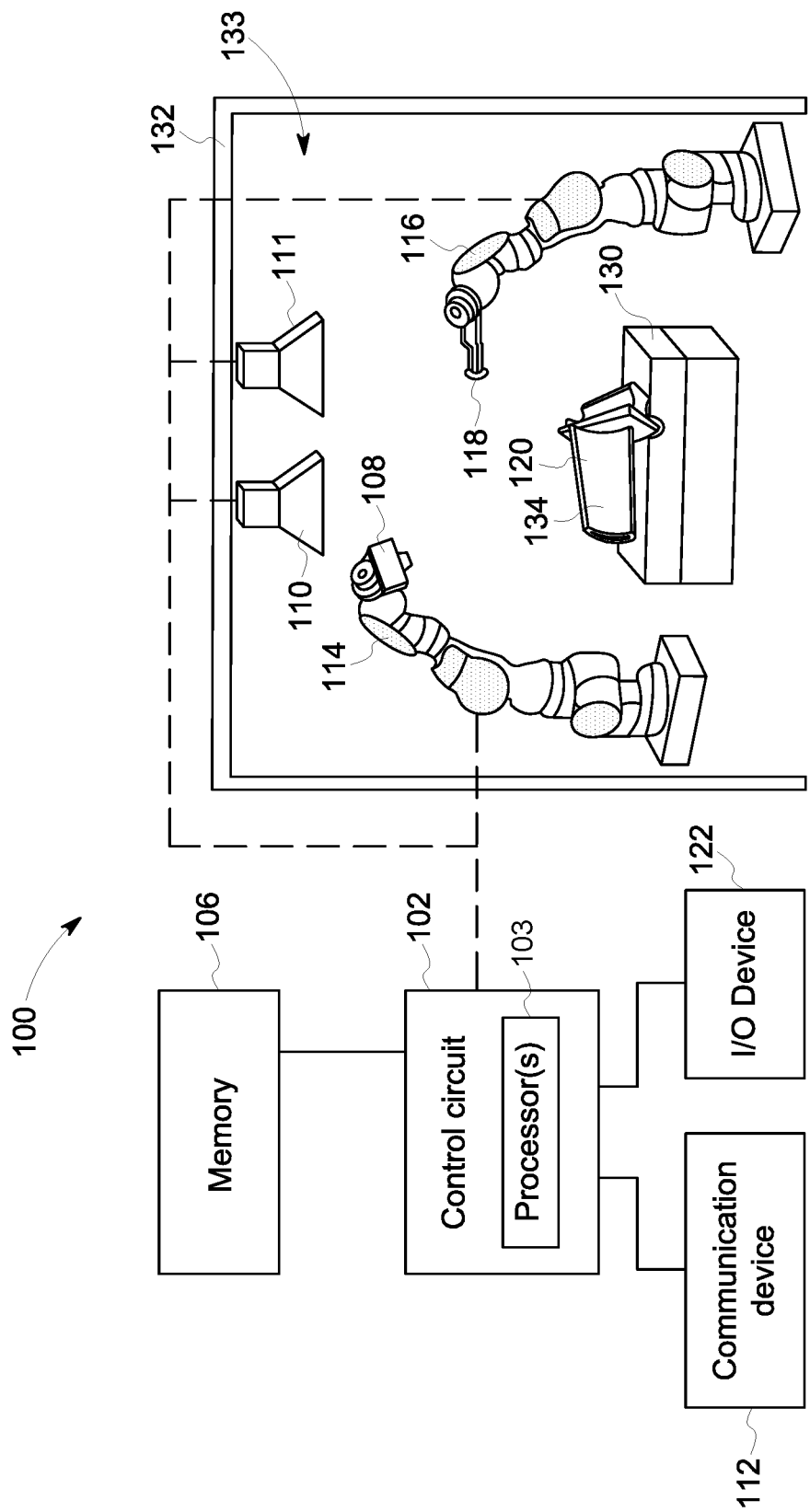
FIG. 1 is a block diagram of an inspection system according to an embodiment.

FIG. 1 is a block diagram of an inspection system 100 according to an embodiment. The inspection system 100 is configured to obtain multiple images of a work piece 120 to support FPI inspection. For example, the inspection system 100 controls one or more imaging devices 108 to capture images of the work piece 120 under different lighting modalities or conditions. The inspection system 100 controls the one or more imaging devices 108 to acquire the images from at least one selected position relative to the work piece 120, and optionally multiple different positions relative to the work piece 120. The inspection system 100 may be configured to automatically combine the images acquired from different positions to determine the area of coverage of the work piece 120 captured in the images. The images referred to herein are defined by image data, and may be captured as still images or frames of a video.

The inspection system 100 includes a control circuit 102 that is operably connected to a memory storage device 106. The control circuit 102 includes one or more processors 103 and associated circuitry. For example, the control circuit 102 includes and/or represents one or more hardware circuits or circuitry that include, are connected with, or that both include and are connected with the one or more processors 103, controllers, and/or other hardware logic-based devices. The control circuit 102 may include a central processing unit (CPU), one or more microprocessors, a graphics processing unit (GPU), or any other electronic component capable of processing inputted data according to specific logical instructions. For example, the control circuit 102 may execute programmed instructions stored on the memory storage device 106 or stored on another tangible and non-transitory computer readable medium.

The memory storage device 106 (also referred to herein as memory 106) is a tangible and non-transitory computer readable medium. The memory 106 may include or represent a flash memory, RAM, ROM, EEPROM, and/or the like. The control circuit 102 and the memory 106 may obtain the images of the work piece 120 directly from the one or more imaging devices 108, or indirectly via a remote server or other storage device. The control circuit 102 may be operably connected to the one or more imaging devices 108 via a wired or wireless communication link. The obtained images may be stored in the memory 106 or stored in another storage device that is accessible to the control circuit 102.

The one or more imaging devices 108 may be or include at least one camera, sensor, scanner, or the like. The one or more imaging devices 108 are configured to capture images in an ultraviolet (UV) light setting. For example, the one or more imaging devices 108 capture UV induced visible fluorescence and/or UV induced non-visible fluorescence from the work piece 120. The one or more imaging devices 108 are also configured to capture images in a visible light setting, such that the one or more imaging devices 108 capture visible light reflected off the work piece 120. In an embodiment, the inspection system 100 has a single imaging device 108 that includes hardware for capturing UV images and hardware for capturing visible light images. Alternatively, the inspection system 100 includes a first imaging device 108 with hardware for capturing UV images and a second imaging device 108 with hardware for capturing visible light images. Although the following description refers to imaging device 108 in the singular, it is recognized that the inspection system 100 may have multiple imaging devices 108.

The imaging device 108 may have one or more filters and/or lenses designed to restrict the wavelengths permitted through the filters and/or lenses. For example, the imaging device 108 may have a barrier filter that permits only light within a certain band of wavelengths in the visible light spectrum to penetrate the filter, excluding other wavelengths present in ambient light and/or white light. In addition, or alternatively, the imaging device 108 may have a barrier filter that permits only light within a certain band of wavelengths in the UV light spectrum to penetrate the filter. The imaging device 108 captures images that represent the subject matter in a field of view of the imaging device 108 at the time that the specific image was captured.

In the illustrated embodiment, the inspection system 100 includes a visible light source 110, an ultraviolet light source 111, a first robotic arm 114, a second robotic arm 116, a communication device 112, and an input/output device 122 in addition to the control circuit 102, the memory 106, and the imaging device 108. The inspection system 100 may include additional components not illustrated in FIG. 1. In an alternative embodiment, the inspection system 100 may have at least some different components than the components shown in FIG. 1. For example, the inspection system 100 may only have one of the two robotic arms 114, 116 or at least three robotic arms in an alternative embodiment.

The imaging device 108 is mounted on the first robotic arm 114. The first robotic arm 114 is able to move the imaging device 108 along multiple axes (e.g., lateral, longitudinal, and vertical) relative to the work piece 120. The first robotic arm 114 can also adjust the angle of the imaging device 108 relative to the work piece 120. The first robotic arm 114 is operably connected to the control circuit 102 via a wired or wireless communication link. For example, the control circuit 102 controls the first robotic arm 114 to move the imaging device 108 to specific selected positions in space. Each selected position has specific location coordinates (e.g., x, y, z) in a coordinate system, and specific angle coordinates (e.g., rx, ry, rz). For example, the position of the imaging device 108 refers to both the location and angle of the imaging device 108. The location and angle may be relative to the work piece 120 or to another reference point. Alternatively, at least one of the location or the angle may be an absolute value. The control circuit 102 may control the first robotic arm 114 to move the imaging device 108 from a first position to a second position by (i) changing the location of the imaging device 108 only, (ii) changing the angle of the imaging device 108 only, or (iii) changing both the location and the angle of the imaging device 108. The first robotic arm 114 may have various actuators and/or axes of rotation to manipulate the imaging device 108 as dictated by the control circuit 102. In an alternative embodiment, at least one of the light sources 110, 111 is mounted on the first robotic arm 114 with the imaging device 108, instead of being mounted remote from the robotic arm 114.

The inspection system 100 is configured to inspect work pieces 120 having various shapes and sizes. In the illustrated embodiment, the work piece 120 is a rotor blade, such as from a compressor or a turbine. Non-limiting examples of other types of work pieces 120 that may be inspected in the system 100 include nozzles, shafts, wheels, pistons, combustion chambers, and the like. For example, the work piece 120 may be a metal component of an engine, a vehicle, or other machinery. The work piece 120 may have a non-porous surface onto which a fluorescent dye is applied for FPI inspection.

The work piece 120 is disposed on a base 130 or platform. In the illustrated embodiment, the work piece 120 remains stationary in a fixed position on the base 130 throughout the inspection, and the imaging device 108 moves relative to the work piece 120 via the first robotic arm 114 to capture the images. In an alternative embodiment, the base 130 may be or include a turn table that rotates to adjust a position of the work piece 120 relative to the imaging device 108. Although only one work piece 120 is shown in FIG. 1, the base 130 may be a tray that holds multiple work pieces 120 side by side for concurrent inspection of the work pieces 120. In an alternative embodiment, the imaging device 108 remains stationary in a fixed position throughout the inspection, and the first robotic arm 114 holds and moves the work piece 120 relative to the imaging device 108 to capture the images at one or more positions.

The second robotic arm 116 holds a swab 118. The swab 118 may be an absorbent material in the shape of a pad, clump, cloth, a sponge, or the like, or a brush. The second robotic arm 116 movable relative to the work piece 120 to wipe, brush, or otherwise contact the work piece 120 with the swab 118 to remove or displace dust, debris, and other contaminants from the surface of the work piece 120. The second robotic arm 116 is operably connected to the control circuit 102 via a wired or wireless communication link, and may be controlled by the control circuit 102. For example, the control circuit 102 may transmit control signals to the second robotic arm 116 via the communication link to control the robotic arm 116 to wipe or brush one or more specific regions of the work piece 120 with the swab 118, as described herein.

The visible light source 110 emits light within the visible band of wavelengths in the electromagnetic spectrum. For example, the visible band of wavelengths may extend from about 400 nm to about 750 nm. As used herein, a wavelength that is "about" a specific value may include wavelengths within a designated range of that specific value, such as within 30 nm of the specific value. The visible light source 110 may provide visible light with a broad band of wavelengths (e.g., white light), or may provide light with a narrow band of wavelengths. The visible light source 110 may have a filter for controlling the waveband of visible light emitted from the light source 110.

The ultraviolet light source 111 emits light within the UV band of wavelengths in the electromagnetic spectrum, which has shorter wavelengths than the visible band. For example, the UV band may extend from about 1 nm to about 400 nm. The UV light source 111 may provide UV light with a narrow band of wavelengths within the UV band or a broad band of wavelengths in the UV band. For example, the UV light source 111 may have a filter (e.g., an exciter filter) that narrows the illuminant waveband to only allow UV radiation through the filter that induces a particular fluorescence. For example, the type of filter or setting of the filter may be selected based on the properties of the fluorescent dye applied to the work piece 120 such that the UV radiation permitted through the filter induces a desired fluorescent response by the dye.

The visible light source 110 and the ultraviolet light source 111 are both operably connected to the control circuit 102 via wired and/or wireless communication links. The control circuit 102 is configured to independently operate the light sources 110, 111 by controlling when each of the light sources 110, 111 is activated (e.g., emitting light) and deactivated (e.g., not emitting light). For example, the control circuit 102 may implement a visible light setting by activating the visible light source 110 and deactivating the UV light source 111. The control circuit 102 may implement a UV light setting by activating the UV light source 111 and deactivating the visible light source 110. Although the light sources 110, 111 are discrete and separate from one another in the illustrated embodiment, the two light sources 110, 111 may share one or more components, such as a common housing, in another embodiment.

The inspection system 100 optionally includes a shroud structure 132 that surrounds the work piece 120 and robotic arms 114, 116. The light sources 110, 111 are mounted on and/or within the shroud structure 132 and emit light into a chamber 133 defined by the shroud structure 132. The shroud structure 132 may shield the inspection process from external light, such as ambient or white light, which may enable better control over the lighting conditions during the inspection process. The shroud structure 132 may be a tent, drapes, rigid walls, or the like.

The input/output (I/O) device 122 of the inspection system 100 includes at least one display device and at least one user input device that allows an operator to interact with the inspection system 100. The I/O device 122 is operably connected to the control circuit 102. The display may be a liquid crystal display (e.g., light emitting diode (LED) backlight), an organic light emitting diode (OLED) display, a plasma display, a CRT display, and/or the like. The user input device may be a touchpad, a touchscreen, a mouse, a keyboard, physical buttons, or the like, that is configured to receive inputs from the operator. For example, the operator may use the display to view the results of the FPI inspection and for selecting additional actions, such as scheduling repair of the work piece 120, admitting the work piece 120 as passing the inspection, or discarding the work piece 120. In an embodiment, the operator may participate in the analysis by viewing the images captured by the imaging device 108 on the display, and by using the user input device to select areas of the images that have potential defects for additional inspection of the work piece 120 in regions corresponding to the selected areas in the images. The I/O device 122 optionally includes additional outputs, such as audio speakers, vibrating devices, or the like, for alerting the operator.

The control circuit 102 may be operably connected to a communication device 112 of the inspection system 100 that includes hardware such as a transceiver, receiver, transmitter, and/or the like, and associated circuitry (e.g., antennas). The communication device 112 may be controlled by the control circuit 102 to wirelessly communicate with one or more of the components of the inspection system 100, such as the imaging device 108, the light sources 110, 111, and/or the robotic arms 114, 116. The communication device 112 in addition or alternatively may wirelessly connect the control circuit 102 to another device, such as a remote server, a mobile device (e.g., held by an operator), or the like.

Optionally, the control circuit 102, the memory 106, the communication device 112, and the I/O device 122 may be components within a common device, such as a computer (e.g., desktop, laptop, tablet, smart phone, mobile work station, etc.). For example, the control circuit 102, the memory 106, the communication device 112, and the I/O device 122 may be commonly surrounded by a housing or case. The communication device 112 and the I/O device 122 may be optional components of the inspection system 100, such that alternative embodiments may lack one or both of the devices 112, 122.

The inspection system 100 according to one or more embodiments automatically performs all, or at least a portion of, an FPI inspection process to detect and evaluate FPI defects on the work piece 120. For example, the work piece 120 on the base 130 has a fluorescent dye applied onto a surface 134 of the work piece 120 that is being inspected (e.g., an inspection surface 134). The inspection surface 134 may represent a portion of the work piece 120 (e.g., a top side) that is generally facing away from the base 130 towards the light sources 110, 111. The work piece 120 may be cleaned prior to the application of the dye. After the dye application, the inspection surface 134 of the work piece 120 is cleaned and dried to remove a majority of the dye from the work piece 120. A developer may be applied to the surface 134 of the work piece 120. The cleaning process does not remove dye that penetrates into discontinuities in the surface 134, such as cracks, nooks, crannies, irregular surface conditions, etc. The discontinuities represent potential defects in the work piece 120. After cleaning and drying the surface 134, at least a portion of the dye within such discontinuities may seep (e.g., bleed) out of the discontinuities onto the surrounding area of the surface 134. The FPI inspection process uses UV induced fluorescence of the dye that bleeds out of discontinuities in the work piece 120 to detect potential defects in the work piece 120. Optionally, the inspection system 100 shown in FIG. 1 is configured to perform the steps of the FPI inspection process subsequent to the initial dye application and cleaning stages.

According to one or more embodiments, the control circuit 102 performs the FPI inspection by controlling the imaging device 108 to capture one or more images of the work piece 120 (e.g., a first set of images) in a UV light setting and one or more images of the work piece 120 (e.g., a second set of images) in a visible light setting. The first and second sets of images are captured by the imaging device 108 at the same one or more positions of the imaging device 108 relative to the work piece 120. For example, for each image in the first set captured at a designated position of the imaging device 108, there is a corresponding image in the second set captured at the same designated position, such that the only difference between the corresponding images in the first and second sets are the lighting conditions. The control circuit 102 may analyze the images obtained from the imaging device 108 under the different lighting conditions to detect image data indicative of defects in the work piece 120. The control circuit 102 maps the images to a computer design model of the work piece 120 to calibrate the graphic location of a defect in the images with the physical location of the defect in the actual work piece 120. In addition to determining the physical location of defects, the mapping of the images to the computer design model enables measurement of the physical dimensions (e.g., sizes) of the defects based on the image data.

The following paragraphs describe an FPI inspection operation performed by the inspection system 100 according to at least one embodiment. The control circuit 102 obtains a computer design model of the work piece 120. The computer design model may be a three-dimensional (3D) model that has points (e.g., voxels) representing the work piece 120 in a 3D computer coordinate system. The computer design model may be a scale representation of the work piece 120. For example, the difference in size between the actual work piece 120 and a displayed size of the model on the display of the I/O device 122, for example, may be known, which enables the inspection system 100 to calculate lengths of the actual work piece 120 by measuring corresponding lengths along the model. The computer design model may be a computer-aided design (CAD) model or the like. The control circuit 102 may obtain the computer design model of the work piece 120 from an external source via the communication device 112 or a wired port or drive. The computer design model may be stored, at least temporarily, within the memory 106.

Using the computer design model, the control circuit 102 selects one or more positions of the imaging device 108 at which to capture images of the inspection surface 134 of the work piece 120. For example, the one or more positions are selected to ensure that the entire inspection surface 134 of the work piece 120 is depicted within the images acquired at the selected position(s).

Figure 2:
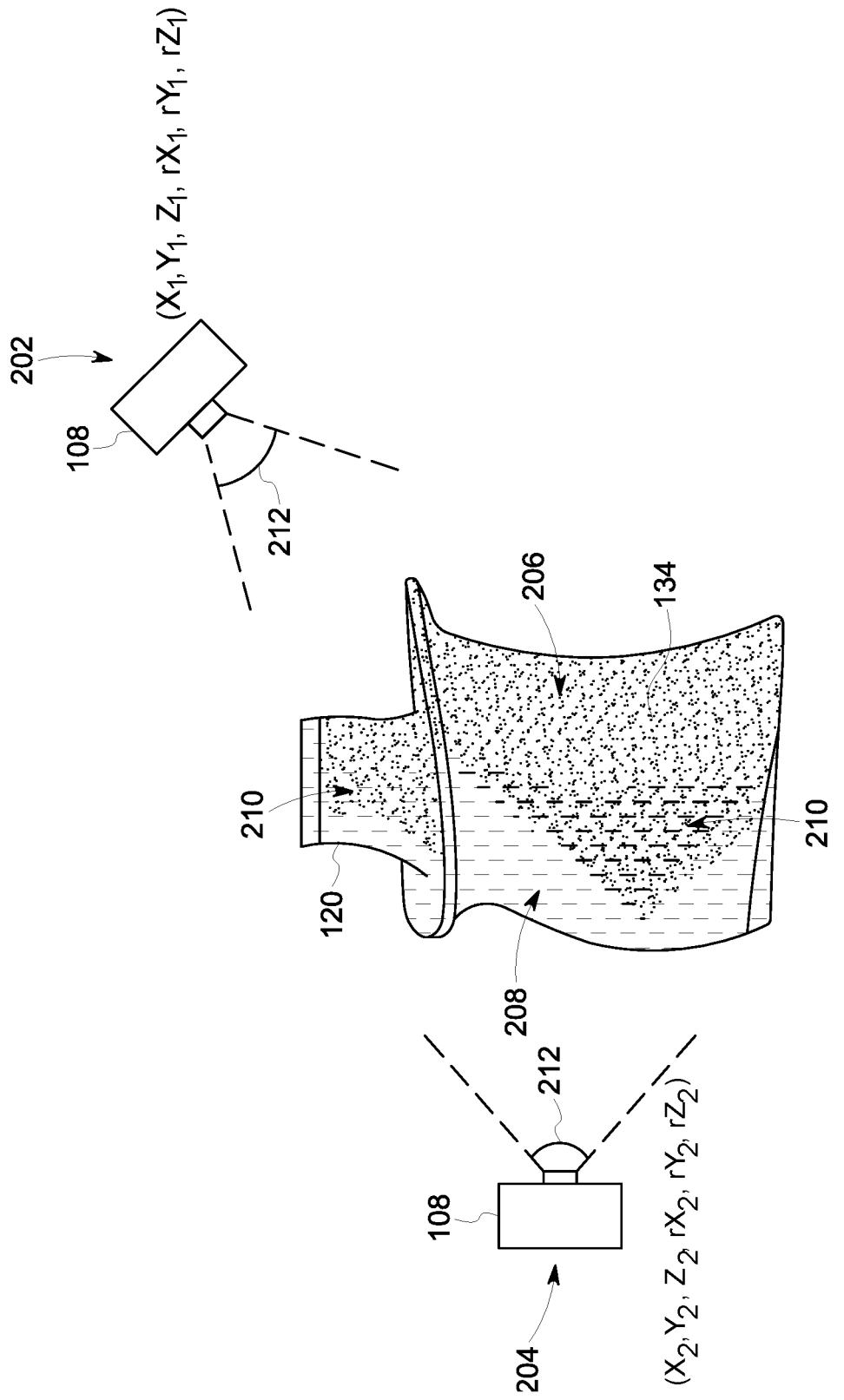
FIG. 2 illustrates a work piece and an imaging device of the inspection system at two different positions relative to the work piece.

Additional reference is now made to FIG. 2, which illustrates the work piece 120 and the imaging device 108 at two different positions relative to the work piece 120. The work piece 120 in FIG. 2 may be a 3D representation of the work piece 120 in the computer design model. The imaging device 108 is shown at a first position 202 and a second position 204 relative to the work piece 120. For example, the first position 202 has location coordinates $(x_1, y_1, z_1)$ and angle coordinates $(rx_1, ry_1, rz_1)$. The two angle coordinates refer to angles in two perpendicular planes. For example, the robotic arm 114 may be configured to tilt and rotate the imaging device 108 in two perpendicular planes to achieve various angles. The second position 204 has location coordinates $(x_2, y_2, z_2)$ and angle coordinates $(rx_2, ry_2, rz_2)$. Both the location and the angle of the second position 204 differ from the location and the angle of the first position 202.

The control circuit 102 may select the first and second positions 202, 204 as the designated positions at which the imaging device 108 will acquire images of the work piece 120 during the FPI inspection process. The total number of positions 202, 204, as well as the locations and angles thereof, may be calculated by the control circuit 102 based on factors such as the field of view of the imaging device 108, the size of inspection surface 134 of the work piece 120, the complexity of the inspection surface 134 (e.g., surface topology), and the like. The control circuit 102 may utilize the computer design model of the work piece 120 to determine measurements and features of the work piece 120 that are factored into the calculation.

The position selection calculation may also depend on constraints, such as a maximum permitted relative angle from the normal axis from the surface 134 of the work piece 120 to the imaging device 108. For example, an acceptable range of angles from the normal axis may be within 45 degrees, within 30 degrees, within 20 degrees, or within 10 degrees from the normal axis. This angular constraint may be implemented such that the imaging device 108 is relatively orthogonal to the inspection surface 134 to ensure that the imaging device 108 receives a sufficient amount of light reflected or radiated from the inspection surface 134. Another constraint may dictate that the entire inspection surface 134 of the work piece 120 is captured in the image data acquired at the one or more selected positions, which ensures that the entire surface 134 is inspected for defects.

The control circuit 102 may solve an optimization problem to select one or more positions from a large set of potential positions as on output or result of the optimization problem based on the known characteristics of the work piece 120 and the imaging device 108 and the designated constraints. For example, the control circuit 102 may utilize the known information to simulate the regions or areas of the work piece 120 that would be captured in image data by the imaging device 108 at each of the potential positions. For example, FIG. 2 shows a coverage area 206 (represented by dot shading in FIG. 2) that would be captured by the imaging device 108 at the first position 202 with a set field of view 212 of the imaging device 108. FIG. 2 also shows a different coverage area 208 (represented by dash shading in FIG. 2) that would be captured by the imaging device 108 at the second position 204 with the same field of view 212. The coverage area 206 is generally along the right half of the work piece 120 in FIG. 2, and the coverage area 208 is generally along the left half of the work piece 120. There are overlapping areas 210 in which the coverage areas 206, 208 overlap, indicating that these portions of the work piece 120 would be captured in an image acquired at each of the two positions 202, 204. As shown in FIG. 2, the combination of the two coverage areas 206, 208 covers the entire inspection surface 134 of the work piece 120.

Although two positions are selected for the FPI inspection in the illustrated embodiment, in other embodiments the control circuit 102 may select only one position or more than two positions. For example, if the imaging device 108 is able to capture the entire inspection surface 134 of the work piece 120 from a single position in satisfaction of all assigned constraints, then the control circuit 102 may select the single position for capturing the image data instead of multiple positions.

After selecting the one or more positions, the control circuit 102 begins an image acquisition stage. The control circuit 102 controls the robotic arm 114 to move the imaging device 108 to a first of the two selected positions 202, 204. For example, the robotic arm 114 may move the imaging device 108 to the first position 202, which is also referred to as a canonical position 202. At the canonical position 202, the imaging device 108 is controlled to acquire an image of the work piece 120 in a visible light setting. For example, the control circuit 102 may establish the visible light setting by activating the visible light source 110 and deactivating the UV light source 111 (or maintaining the UV light source 111 in a deactivated state, if applicable). As a result, the work piece 120 within the chamber 133 of the shroud structure 132 is illuminated by light having a visible band of wavelengths.

Without moving the imaging device 108 from the canonical position 202, the imaging device 108 is controlled to acquire another image of the work piece 120, but this time in a UV light setting. The control circuit 102 may establish the UV light setting by deactivating the visible light source 110 and activating the UV light source 111. As a result, the work piece 120 within the chamber 133 is illuminated by UV light (having one or more wavelengths within the UV band). In the UV light setting, the chamber 133 may be dim from the perspective of an operator due to the lack of visible light within the chamber 133. Although the visible light image is described above as being captured prior to capturing the UV image, it is recognized that the order may be reversed such that the UV image is acquired before the visible light image.

Figure 3:
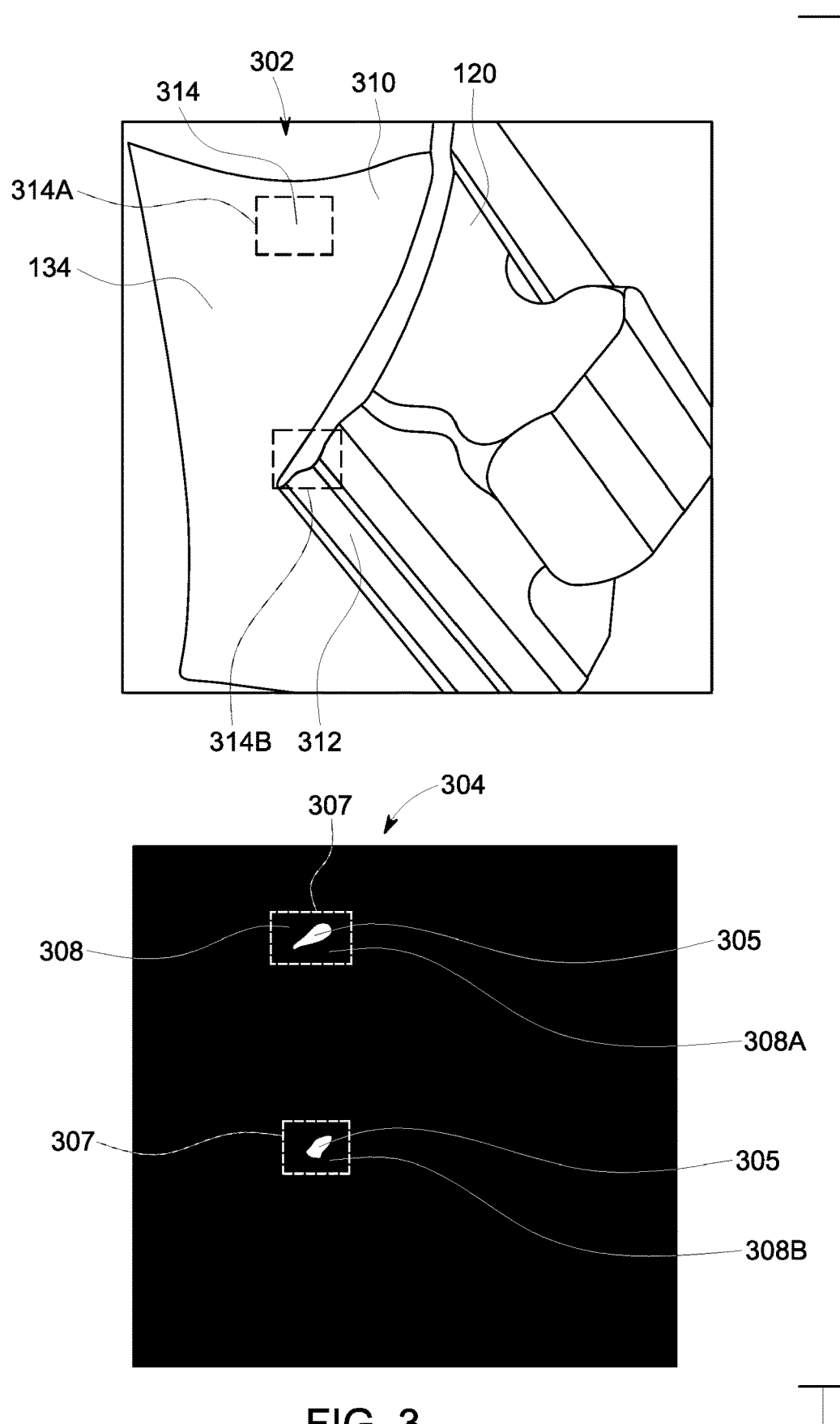
FIG. 3 shows a first image of the work piece acquired in a visible light setting and a second image of the work piece acquired in a UV light setting.

Reference is now made to FIG. 3, which shows a first image 302 of the work piece 120 acquired in the visible light setting and a second image 302 of the work piece 120 acquired in the UV light setting. Although the two images 302, 304 are acquired under different lighting conditions or modalities, the imaging device 108 captures both images 302, 304 from the same position relative to the work piece 120 (e.g., the canonical position 202 shown in FIG. 2). As a result, both of the images 302, 304 depict the same subject matter (e.g., the coverage area 206 of the work piece 120 shown in FIG. 2).

Optionally, the control circuit 102 may perform an initial analysis on the two images 302, 304 acquired at the canonical position 202 to ensure that various pre-conditions are satisfied before advancing with the FPI inspection process.

For example, one pre-condition may involve measuring the average intensity of light in the UV image 304. The light in the UV image 304 represents UV-induced radiation from the dye on the work piece 120. The average intensity may be an average intensity of each of the pixels in the UV image 304. If the average intensity of the light in the UV image 304 exceeds a designated threshold, then there is an excessive amount of residue (e.g., fluorescent dye, dust, debris, contaminants, etc.) on the work piece 120. For example, if a significant amount of the inspection surface 134 radiates or reflects light that is captured by the imaging device 108 in the UV image 304, then it is difficult to distinguish actual defects from false positives, such as residual dye (unassociated with bleed back from a defect), dust, dirt, and other contaminants. In response, the work piece 120 is scheduled for additional cleaning to remove the excess residue prior to restarting the image acquisition stage. If the average light intensity in the UV image 304 is at or below the designated threshold, then the pre-condition is satisfied.

Another pre-condition checks the alignment of the work piece 120 relative to the system 100. More specifically, the control circuit 102 may analyze the visible light image 302 to compare the alignment of the work piece 120 in the visible light image 302 with a reference pose. The reference pose may be stored in the memory 106 or another storage device accessible to the control circuit 102. The control circuit 102 may perform a simple image analysis, such as edge detection, to determine a perimeter outline of the work piece 120 depicted in the visible light image 302. If the perimeter outline in the image 302 aligns with the reference pose within a designated margin of error, then the pre-condition is considered satisfied. On the other hand, if the perimeter outline does not align with the reference pose, then the work piece 120 may need to be realigned on the base 130. The misalignment of the work piece 120 to the reference pose may also indicate if the work piece 120 is a different size or type of work piece 120 than is expected by the control circuit 102. For example, the control circuit 102 may be scheduled to perform FPI inspection on a blade, but the actual work piece 120 on the base 130 is a nozzle. This alignment check can be used to correct the error before continuing with the FPI inspection.

In the FPI inspection process according to an embodiment, the control circuit 102 is configured to map the visible light image 302 to the computer design model of the work piece 120. The control circuit 102 may utilize an image analysis technique, such as feature matching, edge detection, boundary analysis, edge registration, edge fitting, or the like, to determine which parts of the computer design model of the work piece 120 are depicted in the subject matter of the image 302. In a non-limiting example, the control circuit 102 may perform feature matching to map the visible light image 302 to the computer design model. In the feature matching analysis, the control circuit 102 may identify a set of designated features that are depicted in the image 302, such as a corner of the blade, an end of the blade, a corner of a flange, etc., and determines coordinates and/or dimensions of each of the designated features within the frame of the image 302. For example, the coordinates and dimensions of the designated features in the image 302 may be based on the number and locations of pixels that represent the designated features. The control circuit 102 locates corresponding features in the computer design model that represent the set of designated features from the image 302, and determines coordinates and/or dimensions of each of the corresponding features within the 3D coordinate system of the computer design model. The control circuit 102 then groups the information about each of the designated features in the image 302 with the associated information from the features in the computer design model to generate data pairs. For example, a specific corner of the blade of the work piece 120 may be depicted in the image 302 by ten pixels, each having known 2D coordinates in the image 302. The same corner of the blade may be represented by six voxels having known 3D coordinates in the computer design model, so a data pair for the corner of the blade is generated with the image data and the model data.

The control circuit 102 may generate a transfer function that converts the coordinates and sizes of the features in the image 302 to the coordinates and sizes of the corresponding features in the computer design model. For example, the transfer function may reduce the offset between the image data and the model data in each of the data pairs representing a designated feature of the work piece 120. The control circuit 102 may apply the transfer function to points or regions of the visible light image 302 to determine the corresponding points or regions in the computer design model. The transfer function may also be used to determine dimensions (e.g., lengths, sizes, etc.) of defects identified in the image data by converting dimension of defects depicted in the image 302 to the computer design model, which is a scale representation of the actual work piece 120.

It is recognized that mapping the visible light image 302 to the computer design model constructively also maps the UV image 304 to the computer design model because both of the images 302, 304 depict the same subject matter in the same perspective and frame of reference. For example, although the two images 302, 304 differ in appearance, the pixels at a given location (e.g., 2D image coordinates) in the visible light image 302 depict the same subject matter as the pixels at an analogous location (e.g., corresponding 2D image coordinates) in the UV image 304 because the two images 302, 304 are captured from the same location and angle.

Mapping the UV image 304 to the computer design model also may enable the pixel intensity of the UV image 304 to be normalized. For example, knowing the depth and 3D model geometries, the control circuit 102 may normalize the UV light intensity to generate a uniform intensity over the total area of the UV image 304. The intensity of the pixels in the visible light image 302 may also be normalized over the total area of the visible light image 302 based on the computer design model.

After acquiring the two images 302, 304 under the two different lighting conditions at the canonical position 202, the control circuit 102 may control the robotic arm 114 to move the imaging device 108 to another of the selected positions, if any. For example, the robotic arm 114 may be controlled to move to the second position 204 (shown in FIG. 2), at which the control circuit 102 repeats the image analysis stage with the imaging device 108 in the second position 204. For example, the control circuit 102 controls the light sources 110, 111 to provide the visible light setting in which the imaging device 108 captures an image from the second position 204, and separately controls the light sources 110, 111 to provide the UV light setting in which the imaging device 108 captures another image from the same position 204. In an embodiment, for every position that is selected by the control circuit 102, the imaging device 108 captures both a visible light image (e.g., an image acquired in the visible light setting) and a UV image (e.g., an image acquired in the UV light setting) in that position.

The control circuit 102 maps the visible light image acquired by the imaging device 108 in the second position 204 (e.g., the second visible light image) to the computer design model. In an embodiment, the control circuit 102 may map the second visible light image without performing addition image analysis, such as feature matching, on the second visible light image. For example, the control circuit 102 knows the positional offset between the canonical position 202 of the imaging device 108 and the second position 204. Based on the known movement of the robotic arm 114 from the canonical position 202 to the second position 204, the control circuit 102 can calculate the image frame or field of view of the second visible light image relative to the image frame of the first visible light image 302. The previously-generated transfer function aligns the image data from the first visible light image 302 to the computer design model. By utilizing both the transfer function and the known positional offset between the two positions 202, 204 of the imaging device 108, the control circuit 102 may be configured to map the second visible light image to the computer design model (without performing additional image analysis). In an alternative embodiment, the control circuit 102 does perform image analysis on the second visible light image captured at the second position 204 to generate a second transfer function for mapping the second visible light image to the computer design model independent of the mapping of the first visible light image 302.

Upon mapping the second visible light image, some portions of the work piece 120 depicted in the second visible light image may overlap with portions of the work piece 120 depicted in the (first) visible light image 302. For example, the overlapping portions of the images may correspond to the overlapping areas 210 of the work piece 120 shown in FIG. 2. Identifying overlapping portions of the images is useful for detecting the correct amount of defects. For example, if there is a defect along the inspection surface 134 of the work piece 120 within an overlapping area 210 of the work piece 120, one defect may be depicted in the images from each of the two positions 202, 204 of the imaging device 108. Identifying the overlapping portions of the images and mapping the images to the computer design model ensures that such a defect is not interpreted as two different defects.

After acquiring images of the work piece 120 in both UV and visible light settings from each selected position of the imaging device 108 relative to the work piece 120, the control circuit 102 performs a candidate region proposal stage to identify one or more candidate regions in the images that depict a potential defect in the surface 134 of the work piece 120. For example, the one or more UV images, including the UV image 304 shown in FIG. 3, are analyzed to identify candidate regions. The analysis may be automatically performed by the control circuit 102 or one or more other processors.

The candidate regions may be identified based on light characteristics of the pixels in the UV images. The light characteristics that are measured may include intensity, wavelength, or the like. In an embodiment, the candidate regions are identified by identifying pixels with intensities greater than a designated intensity threshold. The intensity threshold may be an absolute value that is uniformly applied to all of the UV images. Alternatively, the intensity threshold may be a relative value specific to each image, such as a threshold relative to an average intensity of all pixels in the specific image. As shown in the UV image 304, a majority of the UV image 304 is dark except for two relatively small clusters 305 of pixels that have greater intensities than the dark surrounding areas.

Figure 4:
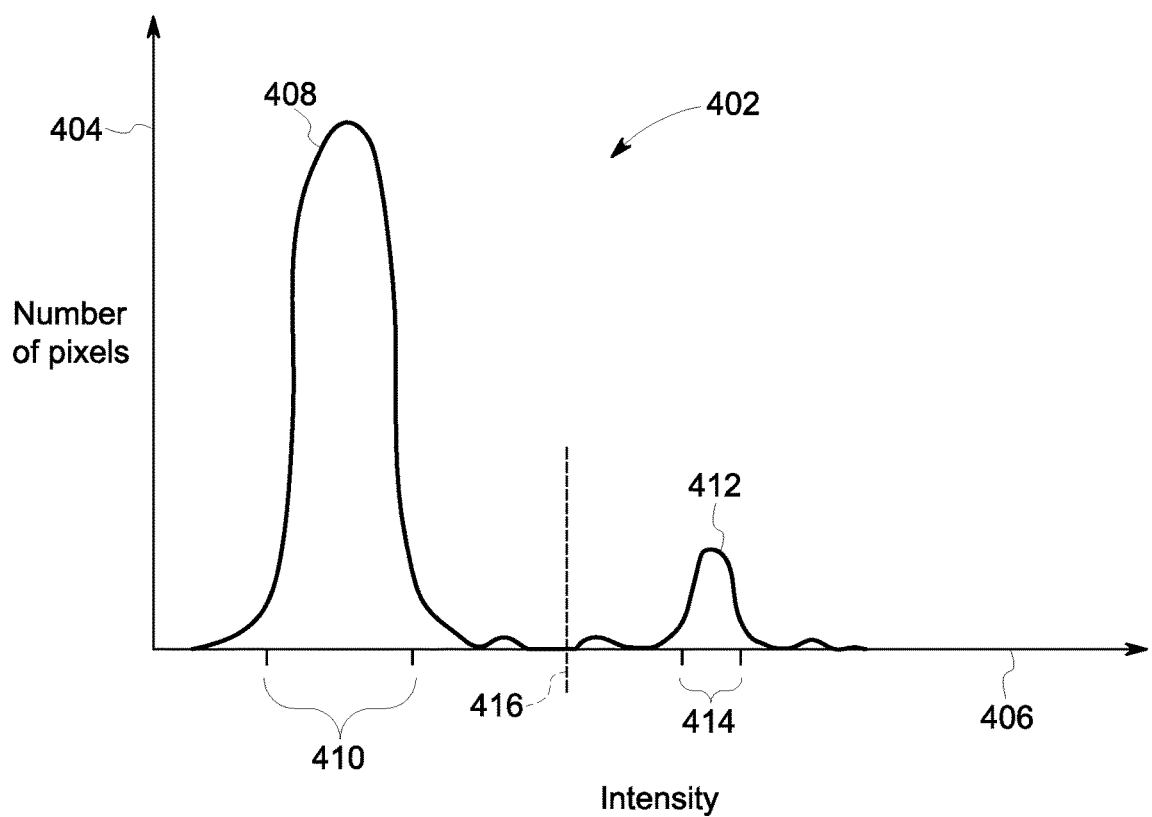
FIG. 4 is a graph showing an example distribution of pixel intensities in a UV image captured by the inspection system according to an embodiment.

FIG. 4 is a graph 402 showing an example distribution of pixel intensities in a UV image captured by the inspection system 100, such as the UV image 304 shown in FIG. 3, according to an embodiment. The graph 402 shows the number of pixels along the vertical axis 404 and pixel intensity along the horizontal axis 406. The graph 402 has a large peak 408 at a first intensity range 410 and a small peak 412 at a second intensity range 414 that is a greater intensity level than the first intensity range 410. The peaks 408, 412 indicate that a majority of the pixels in the UV image have a low intensity, and a minority of the pixels has a greater intensity. The small peak 412 may represent the light-colored, bright pixel clusters 305 in the UV image 304, and the large peak 408 may represent the dark pixel areas of the UV image 304. The control circuit 102 may be configured to analyze the respective pixel intensities and select an intensity value 416 between the first and second intensity ranges 410, 414 as the designated intensity threshold for identifying the candidate regions in the UV images. After setting the intensity threshold, the control circuit 102 may identify the candidate regions in the UV images by identifying clusters of pixels having intensities greater than the designated intensity threshold, such as the clusters 305 shown in FIG. 3. A qualifying cluster of pixels may have multiple adjacent pixels with intensities greater than the threshold. As an alternative to intensity, the wavelengths of the pixels in the UV images may be analyzed to identify the candidate regions.

With reference to the UV image 304 in FIG. 3, the fluorescent intensity of light at the two clusters 305 exceeds the designated intensity threshold. For example, the bright light at the pixel clusters 305 may be attributable to fluorescent dye on the work piece 120 that fluoresces (e.g., emits radiation) responsive to the UV light from the UV light source 111. The dye may have bled or seeped out of a defect in the work piece 120, such as a crack, a spalling or flaking area, a chip, or the like, after the cleaning stage such that the presence of the dye may indicate a defect in the inspection surface 134 of the work piece 120.

After identifying the pixel clusters 305, the control circuit 102 may apply a bounding box 307 around each of the pixel clusters 305 to define respective candidate regions 308 in the UV image 304. For example, the bounding boxes 307 may be quadrilateral (e.g., square, rectangle, or the like) editing mechanisms that demarcate the perimeters of the candidate regions 308. The application of the bounding boxes 307 ensure that the candidate regions 308 have linear sides and designated shapes, which may improve subsequent image processing stages relative to only processing the irregularly-shaped pixel clusters 305. The two candidate regions 308 in the UV image 304 may have the same size and shape, or may have different sizes based on the different sizes of the two pixel clusters 305. Each of the candidate regions 308 may be defined or described by 2D image coordinates of the corners of the bounding box 307. The candidate regions 308 may have shapes other than quadrilaterals in an alternative embodiment.

The identification of candidate regions 308 in the UV image 304 does not ensure the presence of defects in the work piece 120 because the candidate regions 308 may be attributable to other materials and/or substances other than a defect, which are collectively referred to as false positives. Therefore, candidate regions 308 are image areas that potentially contain a defect. At the candidate region proposal stage, it is possible that the relatively high intensity pixel clusters 305 in the UV image 304 are not caused by dye bleeding out of defects, but rather are caused by light reflecting or fluorescing from foreign debris on the work piece 120, such as dust, dirt, powder, oil, or the like. In another example, the pixel clusters 305 could be caused by fluorescent dye along a coarse and/or irregular, but undamaged, area of the inspection surface 134 that was inadequately cleaned prior to the image acquisition stage. Therefore, at the current candidate region proposal stage, the candidate regions 308 may indicate locations of defects and/or false positives.

In addition to analyzing the UV images to identify the candidate regions 308, the control circuit 102 optionally may also analyze the visible light images that were captured in the visible light setting. For example, although it may be easier to detect small cracks and other small defects in the UV images due to the fluorescence of the dye, the visible light images may be analyzed to detect large defects, such as large cracks, large spalling or flaking areas, and the like. The visible light images may show large defects better than the UV images because the cleaning stage may remove all or most of the fluorescent dye from within the large defects.

In an embodiment, after identifying the candidate regions 308 in the UV image 304, the one or more processors identify corresponding candidate regions 314 in the visible light image 302 at analogous locations as the candidate regions 308 in the UV image 304. For example, the candidate regions 314 are at analogous locations as the candidate regions 308 because if the UV image 304 is superimposed onto the visible light image 302, the candidate regions 314 in the visible light image 302 would overlap the corresponding candidate regions 308 in the UV image 304. A first candidate region 314A of the visible light image 302 that corresponds to (or is analogous to) a first candidate region 308A of the UV image 304 may have the same image coordinates relative to the frame as the first candidate region 308A. For example, if the top left corner of the candidate region 308A has 2D coordinates $(X_{231}, Y_{165})$ in the frame of the UV image 304, then the analogous candidate region 314A of the visible light image 302 may be defined as having a top left corner at the coordinates $(X_{231}, Y_{165})$ in the frame of the visible light image 302. Because the two images 302, 304 are captured from the same position of the imaging device 108, each pair of the corresponding candidate regions 308, 314 (e.g., regions 308A and 314A) that are at analogous locations in the images 302, 304 depict the same subject matter. It is recognized that the candidate regions 308, 314 in each corresponding pair need not identically match up with each other to be considered as being at analogous locations in the respective images 302, 304 as long as there is some overlap in the locations of the candidate regions 308, 314.

Identifying the candidate regions 314 of the visible light image 302 may enhance the understanding of the subject matter in the analogous candidate regions 308 of the UV image 304. For example, the two candidate regions 314 of the visible light image 302 include a first candidate region 314A that is analogous to the first candidate region 308A and a second candidate region 314B analogous to a second candidate region 308B. The first candidate region 314A is located along a face of a blade 310 of the work piece 120. The second candidate region 314B is located along an edge of a flange 312 of the work piece 120. Because the candidate regions 314A, 314B are along the areas of the image 302 depicting the work piece 120 and not along the background, the control circuit 102 may not be able to discount or disqualify either candidate region 314A, 314B as a false positive at this time in the FPI inspection process. The following stage is automated defect detection.

In one or more embodiments, the candidate region proposal stage to identify candidate regions 308 in the UV images 304 and corresponding candidate regions 314 in the visible light images 302 may be automated by the control circuit 102 or other processing circuitry based on programmed instructions. In an alternative embodiment, the FPI inspection process may be semi-automated such that the inspection system 100 utilizes operator input during the candidate region proposal stage described above. For example, the control circuit 102 may display the UV images to the operator on the display of the I/O device 122. The operator may review the displayed images and utilize an input device of the I/O device 122, such as a touchscreen, touchpad, mouse, of keyboard, to manually select the candidate regions 308. For example, if the operator views the UV image 304 shown in FIG. 3, the operator may manually select the two bright clusters 305 to mark the clusters 305 as candidate regions 308. The operator may also be able to view the visible light image 302 and manually select areas on the visible light image 302 as candidate regions 314, such as areas that may depict relatively large defects on the work piece 120 viewable without the aid of a fluorescent penetrant dye. The user selections may be communicated as user input messages to the control circuit 102 which documents the user selections in the memory 106.

After the candidate region proposal stage, the control circuit 102 is configured to analyze the candidate regions 308 of the UV image 304 with the corresponding candidate regions 314 of the visible light image 302 to detect a potential defect in the inspection surface 134 of the work piece 120. In an embodiment, the areas of the images 302, 304 outside of the candidate regions 308, 314 are not analyzed, which reduces the amount of image data processed compared to analyzing the entire images 302, 304. For example, the control circuit 102 may effectively crop out the candidate regions 308, 314 from the remaining areas of the images 302, 304 to perform the analysis on the candidate regions 308, 314. The analysis determines if potential defects are present in the surface 134 of the work piece 120 along areas that are depicted in the candidate regions 308, 314.

In at least one embodiment, the control circuit 102 analyzes the candidate regions 308, 314 of the images 302, 304, during an analysis stage, by examining the candidate regions 308, 314 as inputs in a forward propagation direction through layers of artificial neurons in an artificial neural network.

Figure 5:
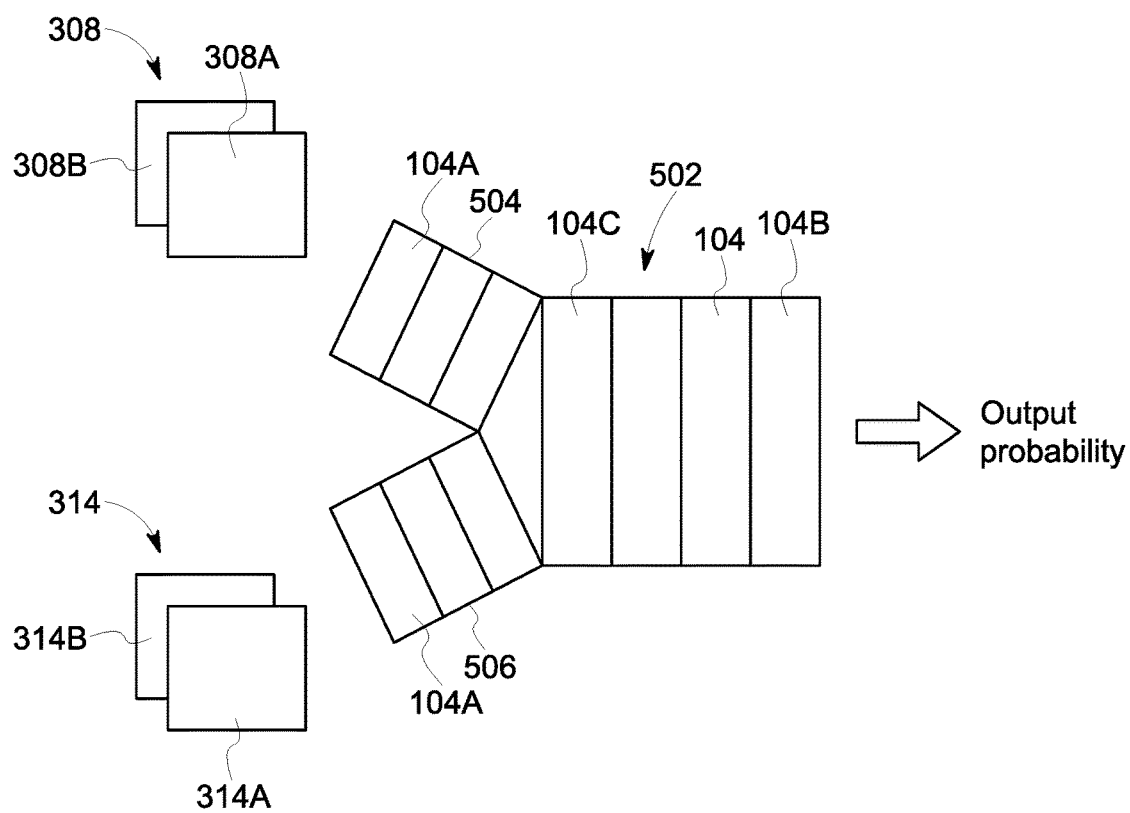
FIG. 5 illustrates an artificial neural network of the inspection system according to an embodiment.

Reference is made to FIG. 5, which illustrates an artificial neural network 502 according to an embodiment. The artificial neural network 502 (also referred to herein as neural network 502) may be utilized by the control circuit 102 during the analysis stage to examine the candidate regions 308, 314 of the images 302, 304 to generate an output probability that the candidate regions 308, 314 depict a defect in the surface 134 of the work piece 120. The artificial neural network 502 may be stored within the memory 106 or may be stored remote from the memory 106 and the control circuit 102. For example, the communication device 112 may communicate the images to the artificial neural network 502 on a remote device, and the communication device 112 may receive a result message from the remote device that provides output probabilities generated by the neural network 502.

The neural network 502 is formed from one or more processors (e.g., microprocessors, integrated circuits, field programmable gate arrays, or the like). The neural network 502 is divided into two or more layers 104, such as one or more input layers 104A that receive an input image, one or more output layers 104B that output a generated probability, and one or more intermediate layers 104C between the input layer(s) 104A and the output layer(s) 104B. The layers 104 of the neural network 502 represent different groups or sets of artificial neurons or nodes, which can represent different functions performed by the one or more processors on the input images to identify objects or features in the input images. The artificial neurons apply different weights in the functions applied to the input image to attempt to identify objects of interest in the input images. For detecting defects in the work piece 120, the artificial neurons in the various layers 104 analyze the candidate regions 308, 314 as input images to identify defects in the surface 134 as the objects of interest.

The artificial neurons in the layers 104 of the neural network 502 can examine individual pixels of the candidate regions 308, 314 that are input into the neural network 502. The neural network 502 may assign or associate different pixels with different object classes based on analysis of characteristics of the pixels. An object class is a type or category of an object appearing in the image. In general, a human body and an automobile can be two different object classes. More specific object classes for the inspection system 100 described herein may include a crack as one object class, an intact (undamaged) surface of the work piece 120 as another object class, a background environment behind the work piece 120 as another object class, a spalling or flaking region as still another object class, and the like.

Each pixel analyzed in the neural network 502 can be labeled (e.g., associated) with a probability that the pixel represents various different object classes. For example, the artificial neuron (e.g., processors) can use linear classification to calculate classification scores for the different object classes or categories, and the classification scores indicate probabilities that a pixel represents each of various object classes. The classification score for a given pixel can be represented as a vector [a b c d], where the values of a, b, c, and d indicate the probability of the pixel representing each of different object classes. The classification score is referred to herein as a classification vector. Each artificial neuron can apply a mathematical function, such as an activation function, to the same pixel, with the functions applied by different neurons impacting the functions applied by other neurons. Different neurons may apply different weights to different terms in the functions than one or more, or all other neurons. Application of the functions generates the classification vectors for the pixels in the candidate regions 308, 314, which can be used to identify defects in the work piece 120 depicted in the candidate regions 308, 314. The neural network 502 may not be 100% accurate in predicting what objects are represented by different pixels, so the output of the neural network 502 includes a confidence indicator, such as a probability.

The neurons in the layers 104 of the neural network 502 determine the classification vectors for the various pixels in the candidate regions 308, 314 by examining characteristics of the pixels, such as the intensities, colors (e.g., wavelengths), and/or the like. The layers 104 of artificial neurons in the neural network 502 can examine the input image (e.g., each candidate region) in sequential order, with the neurons of one intermediate (or hidden) layer 104C examining a given pixel, followed by the neurons in an adjacent intermediate layer 104C, and so on, to calculate the classification vectors of the given pixel. The results of functions applied to characteristics of a pixel by the neurons in preceding layers 104 of the neural network 502 influence the application of functions by the neurons in subsequent layers 104.

After the layers 104 of the neural network 502 have determined the classification vectors for the pixels, the neural network 502 examines the classification vector of each pixel and determines the highest probability object class for each pixel. For example, a first pixel in the candidate region 314 having a classification vector of [0.6 0.15 0.05 0.2] indicates that the neural network 502 calculated a 60% probability that the first pixel represents a first object class (e.g., a defect in the form of a crack), a 15% probability that the first pixel represents a second object class (e.g., an intact or undamaged area of the surface of the work piece), a 5% probability that the first pixel represents a third object class (e.g., background behind the work piece), and a 20% probability that the first pixel represents a fourth object class (e.g., a defect in the form of spalling or flaking of a coating on the work piece).

The probability generated as an output of the neural network 502 may be based on the determined probabilities for the individual pixels in the input images. The processors in the neural network 502 can determine that each pixel represents the object class having the greatest or largest probability in the corresponding classification vector for that pixel. For example, the processors can determine that the first pixel described above represents a portion of a crack-type defect due to the 60% probability of being the crack object class. The selected probability may be used to convert the classification vector of the corresponding pixel to a one-hot vector. For example, the classification vector [0.6 0.15 0.05 0.2] described above would be converted to the one-hot vector [1 0 0 0], indicating that the pixel is determined to be part of a defect in the form of a crack. This process can be repeated for all (or at least some) of the pixels in the candidate regions 308, 314 input into the neural network 502.

Weight values associated with each vector and neuron in the neural network 502 constrain how the input images are related to outputs of the neurons. The weight values can be determined by the iterative flow of training data through the neural network 502. For example, weight values may be established during a training phase in which the neural network 502 learns how to identify particular object classes by typical input data characteristics of the objects in training or ground truth images. For example, the neural network is trained to detect specific defects, such as cracks, spalling (e.g., flaking), abrasions, chips, and the like. During the training phase, labeled training or ground truth images are input into the artificial neural network 502. A labeled training image is an image where all or a substantial portion of the pixels forming the image are associated with known object classes. In a labeled training image, a pixel labeled as [1 0 0 0] indicates that there is a 100% probability that the pixel represents at least a portion of an object in the first object class (e.g., a crack), and a zero percent probability that the pixel represents at least a portion of an object of any of second, third, or fourth object classes (e.g., intact area, background, or spalling).

Additional training of the neural network 502 using labeled training images or ground truth images can improve the accuracy of the neural network 502 at recognizing objects in images that are input into the neural network 502. The training modifies the weights and/or functions of the artificial neurons in the different layers 104, which may result in greater gaps in the probabilities for different object classes. For example, additional training may increase a probability that a pixel is within a first object class and decrease a probability that the pixel is within a second object class, increasing the confidence that the pixel is in the first object class as opposed to the second object class.

In an embodiment, the artificial neural network 502 is a dual branch neural network 502 that has a first branch 504 and a second branch 506. The first and second branches 504, 506 have separate layers 104, including discrete input layers 104A. The two branches 504, 506 merge at one of the intermediate layers 104C. The two branches 504, 506 separately process image data prior to the merger, and the layers 104 after the merger process the image data from the branches 504, 506 together. The candidate region 308 of the UV image 304 may be introduced into the input layer 104A of the first branch 504, and the corresponding candidate region 314 of the visible light image 302 (that is at an analogous location as the candidate region 308) is introduced into the input layer 104A of the second branch 506. Therefore, each pair of corresponding candidate regions 308, 314 may be concurrently examined through the layers 104 of the neural network 502. The layers 104 in the first branch 504 may apply various weights in functions specific for processing UV images. The layers 104 in the second branch 506 may apply various weights in functions specific for processing visible light images. The layers 104 downstream of the merger process the UV image data with the visible light image data.

After the output layer 104B processes the image data, the neural network 502 generates an output probability that the input image data (e.g., the corresponding pair of candidate regions 308, 314) depicts a defect in the surface 134 of the work piece 120. For example, the output probability may be a number between zero and one, such as 0.3, 0.6, or 0.8, or a percentage between 0% and 100%, such as 30%, 60%, or 80%. The output probability indicates a confidence level that the candidate regions 308, 314 depict at least one defect, such as a crack, spalling, chip, abrasion, or the like. An output probability of 0.8 or 80% indicates an 80% chance that the candidate regions 308, 314 depict a defect.

In an embodiment, the control circuit 102 is configured to sequentially input the corresponding pairs of candidate regions 308, 314 into the dual branch neural network 502 to receive an output probability associated with each pair of candidate regions 308, 314. For example, the UV image 304 shown in FIG. 3 has two different candidate regions 308A, 308B. The control circuit 102 inputs a first of the candidate regions 308A into the neural network 502 with the corresponding analogous candidate region 314A of the visible light image 302 at a first time, and then subsequently inputs the other candidate region 308B and the corresponding analogous candidate region 314B at a second time. The control circuit 102 receives a first output probability specific to the first pair of candidate regions 308A, 314A, and a second output probability specific to the second pair of candidate regions 308B, 314B.

According to at least one embodiment, the control circuit 102 is configured to detect that there is a potential defect in a pair of corresponding candidate regions 308, 314 if the output probability from the neural network 502 is greater than a designated probability threshold. The designated probability threshold may be relatively low, such as a value below 0.5 or 50%. For example, the probability threshold may be at or between 0.2 and 0.4 (e.g., 20% and 40%). The probability threshold may be set relatively low to error on the side of over-including candidate regions 308, 314 as having potential defects because additional stages may be performed to confirm the presence of defects. It is anticipated that any potential defects detected during this analysis stage which are actually false positives will be correctly classified during the subsequent stages described herein.

According to one or more embodiments, responsive to the detection of at least one potential defect in at least one pair of candidate regions 308, 314, either via the artificial neural network providing an output probability at or greater than the designated probability threshold or an operator selection, the control circuit 102 performs a bleed back stage. During the bleed back stage, the control circuit 102 controls the second robotic arm 116 (shown in FIG. 1) to physically wipe the work piece 120 with the swab 118 in the specific areas of the work piece 120 that correspond to the respective pair of candidate regions 308, 314. For example, in the illustrated embodiment shown in FIG. 3, assuming that both pairs of the candidate regions 308, 314 satisfy the probability threshold, the control circuit 102 controls the robotic arm 116 to wipe the area of blade 310 depicted by the candidate region 314A in the visible light image 302 and to wipe the area at the edge of the flange 312 depicted by the candidate region 314B. The wiping removes residual dye and external debris and contaminants, such as dust, dirt, debris, and the like from the work piece 120.

In an embodiment, the robotic arm 116 is controlled to only wipe the areas of the work piece 120 corresponding to candidate regions 308, 314 that satisfy the probability threshold, and does not wipe the entire inspection surface 134. For example, if the output probability for the second pair of candidate regions 308B, 314B is less than the designated probability threshold, then the control circuit 102 does not detect the presence of potential defects in the candidate regions 308B, 314B. As a result, the second robotic arm 116 is only controlled to wipe the area of the blade 310 depicted in the first pair of candidate regions 308A, 314A, not the edge of the flange 312. The control circuit 102 is able to move the robotic arm 116 to specific areas of the work piece 120 that correspond to the candidate regions 308, 314 in the image data because the image data is mapped to the computer design model, which is effectively mapped to the actual work piece 120.

After wiping the work piece 120, the control circuit 102 is configured to wait for a designated period of time to allow any remaining fluorescent dye within defects of the work piece 120 to bleed out of the defects onto the surrounding edges of the defects along the inspection surface 134. The designated period of time may be on the order of seconds or minutes. The control circuit 102 subsequently controls the first robotic arm 114, the imaging device 108, and the light sources 110, 111 (shown in FIG. 1) to repeat the image acquisition stage. For example, the robotic arm 114 moves the imaging device 108 to the canonical position 202 (shown in FIG. 2), at which the imaging device 108 acquires another image in the visible light setting and another image in the UV light setting. The robotic arm 114 also moves the imaging device 108 to the second position 204 and any additional selected positions to acquire both a visible light image and a UV light image at each position. For example, the only difference or variable between the first image acquisition stage and the second image acquisition stage may be the condition of the work piece 120, because the work piece 120 is wiped by the second robotic arm 116 between the first image acquisition stage and the second image acquisition stage. The images acquired during the first image acquisition stage may be referred to as pre-wipe images, and the images acquired during the second image acquisition stage may be referred to as post-wipe images.

The imaging device 108 may be controlled to acquire the same number of post-wipe images as the number of pre-wipe images.

The pre-wipe and post-wipe images may be stored in the memory 106. The control circuit 102 may group or classify the pre-wipe images with corresponding post-wipe images in sets. For example, the image captured from the canonical position 202 in the visible light setting prior to the wiping stage may be grouped into a set with the image captured from the canonical position 202 in the visible light setting after the wiping stage. In an embodiment, there may be four images captured from each of the selected positions of the imaging device 108 relative to the work piece 120. The four images include a pre-wipe image in the visible light setting (e.g., the image 302 shown in FIG. 3), a pre-wipe image in the UV light setting (e.g., the image 304), a post-wipe image in the visible light setting, and a post-wipe image in the UV light setting.

The control circuit 102 is configured to compare the candidate regions 308, 314 of the two pre-wipe images (e.g., images 302, 304) to the analogous candidate regions 308, 314 of the two post-wipe images to classify potential defects as a confirmed defect or a false positive during a confirmation stage. The control circuit 102 can identify the analogous candidate regions 308, 314 of the post-wipe images based on the locations (e.g., 2D image coordinates) of the candidate regions 308, 314 in the pre-wipe images because both the pre- and post-wipe images have the same image frames. For each candidate region that potentially depicts a defect, four sub-images are made including a first sub-image of the candidate region in the pre-wipe UV image (e.g., candidate region 308A), a second sub-image of the corresponding candidate region in the pre-wipe visible light image (e.g., candidate region 314A), a third sub-image of the candidate region in the post-wipe UV image, and a fourth sub-image of the candidate region in the post-wipe visible light image. In an embodiment, the control circuit 102 inputs these four sub-images into an artificial neural network to compare the pre-wipe images to the post-wipe images.

The neural network utilized during this confirmation stage may be the same dual branch neural network 502 (shown in FIG. 5) utilized during the prior analysis stage. The parameters of the neural network 502 may be tuned differently than the parameters during the analysis stage. In an embodiment, the pair of candidate regions 308, 314 from the pre-wipe images may be once again input into the different corresponding branches 504, 506 of the neural network 502 in the forward propagation direction. The control circuit 102 may retrieve a data representation of the pre-wipe pair after the merger without allowing all of the layers 104 to process the image data. The data representation may be a feature map or matrix of features extracted from the images by the neural network 502. The control circuit 102 subsequently inputs the analogous pair of candidate regions from the post-wipe images into the branches 504, 506 of the neural network 502, and retrieves a data representation (e.g., feature map or matrix) of the post-wipe pair after the merger but prior to the output layer 104B. Alternatively, the neural network used in the confirmation stage may be different from the dual branch neural network 502.

The control circuit 102 may concatenate the two data representations together to generate a combined probability as an output. The combined probability represents a probability that a given candidate region depicts at least one defect. If the combined probability is at or exceeds a designated confirmation threshold, then the candidate region is confirmed as containing a defect (within the error toler-ance of the neural network 502). The confirmation threshold may be greater than the probability threshold used in the initial analysis stage. For example, the confirmation threshold may be 0.5 (e.g., 50%), or the like. If the combined probability is below the confirmation threshold, then the control circuit 102 determines that the candidate region does not have a defect. For example, the combined probability may be below the confirmation threshold if there is a discrepancy between the candidate regions in the pre-wipe images and the analogous candidate regions in the post-wipe images. The discrepancy may indicate that the perceived defects during the initial analysis stage were actually false positives, such as foreign debris or a foreign substance on the work piece 120 (other than the fluorescent dye), which were removed or at least altered by the intervening wiping. The control circuit 102 may document candidate regions that have combined probabilities below the confirmation threshold as containing a false positive, and may document candidate regions having combined probabilities at or above the confirmation threshold as a confirmed defect.

For each candidate region in the image data that is classified as a confirmed defect, the control circuit 102 may calculate the physical location of the defect within the actual work piece 120. For example, the control circuit 102 may utilize the transfer function that is generated when mapping the images to the computer design model to convert the classified defect in the image frame to a location on the computer design model, which is a scale representation of the actual work piece 120. The control circuit 102 may output coordinates representing the location of the defect within the computer design model coordinate system. In addition to determining the location of one or more defects on the work piece 120, the control circuit 102 may also calculate the dimensions (e.g., sizes) of the defects by applying the transfer function to measured dimensions of the defects in the image data. For example, the control circuit 102 may be able to measure the actual lengths of detected cracks in the work piece 120 based on the image data and the mapping of the images to the computer design model.

After determining the location and sizes of the defects in the work piece 120 within the coordinate system of the computer design model, the control circuit 102 optionally may construct a 3D feature map on the computer design model that shows the defects. For example, the feature map may be viewable on a display device with the defects superimposed onto the computer design model. The feature map may be utilized by an operator for determining whether to pass the work piece 120, repair the work piece 120, discard the work piece 120, or the like, without viewing the actual work piece 120.

In an alternative embodiment, the confirmation stage to differentiate defects from false positives in the image data may be semi-automated such that an operator provides input. For example, instead of using the dual branch neural network 502 for both the analysis stage before the wiping and the confirmation stage after the wiping, one of these two stages may utilize operator input. The confirmation stage may utilize operator input by displaying corresponding pre-wipe and post-wipe images to the operator on the display of the I/O device 122. The operator can look for discrepancies between the identified candidate regions 308, 314 in the pre-wipe images and the corresponding locations in the post-wipe images, and can utilize an input device of the I/O device 122 to confirm each of the identified candidate regions 308, 314 as either a defect (e.g., if the image data is consistent between the pre- and post-wipe images) or a false positive (e.g., if the image date is not consistent). The user selections are communicated as user input messages to the control circuit 102, which may document the user selections in the memory 106.

In at least one embodiment described herein, the inspection system 100 may perform a fully automated FPI inspection process, such that computer processors of the control circuit 102 and the artificial neural network 502 analyze the images to identify candidate regions in the pre-wipe images and classify the candidate regions as defects or false positives, without depending on operator input. The fully automated process has several advantages over the conventional fully manual FPI process, such as increased objectivity, consistency, reliability, repeatability, efficiency, accuracy, and the like. For example, at least one technical effect of the inspection system 100 is that the analysis is performed based on programmed instructions and/or trained artificial neural networks, which are not susceptible to human subjectivity and less prone to error than human operators.

In one or more other embodiments, the inspection system 100 may perform a semi-automated FPI inspection process that utilizes operator input for (i) identifying candidate regions in the pre-wipe images only or (ii) classifying candidate regions as defects or false positives only. Even though some of the analysis is performed by a human operator, the semi-automated FPI process performed by the inspection system 100 still has several advantages over the conventional fully manual FPI process, such as increased accuracy, efficiency, and consistency in the stages that are automated. In addition, at least one technical effect of the inspection system 100 is that the operator does not need to physically manipulate the work piece 120. For example, the operator may be remote from the shroud structure 132 entirely, and may perform the analysis to identify candidate regions and/or classify defects from the comfort of an office using a computer. The operator can avoid direct exposure fluorescent dye and prolonged periods within a dark UV-lit tent or room.

Another technical effect of both the fully automated and semi-automated embodiments of the FPI inspection process performed by the inspection system 100 is the automatic recordation and documentation of data throughout the process. For example, the control circuit 102 may be configured to record various information about the inspection of each work piece 120. The information may be stored in the memory 106 and/or communicated to remote storage, such as a cloud computing server. The control circuit 102 may generate a report that includes the information in a reproducible format. The information that is recorded may include (i) an identity of the work piece 120, (ii) lighting settings (e.g., the intensity, wavelengths, and the like of both the visible light and the UV light), (iii) settings of the imaging device 108, (iv) the selected positions of the imaging device 108; (v) all of the images captured by the imaging device 108, (vi) the image data identified as candidate regions 308, 314, (vi) the subset of the image data classified as defects, (vii) characteristics of the defects (e.g., location and size), (viii) the type of fluorescent dye used, (ix) the regions of the work piece 120 along which the robotic arm 116 wiped, (x) the amount of time permitted after the wiping for the dye to bleed back before acquiring the post-wipe images, and the like. By recording this information, the data from many FPI inspections may be aggregated and studied to improve the FPI inspection process by making the FPI inspection process more objective, consistent, and accurate than the conventional manual process.

Depending on the number, size, and type of defects detected, the work piece 120 may be classified as passing the inspection, scheduled for repair, or discarded (e.g., scrapped). In an embodiment, if the work piece 120 has no detected defects, then the control circuit 102 identifies the work piece 120 as passing the inspection. If the work piece 120 has one or more detected defects, the control circuit 102 may take several responsive actions. For example, the control circuit 102 may generate a command signal or message to automatically schedule the work piece 120 for repair or additional inspection by an operator. Similarly, the control circuit 102 may generate a signal to notify an operator of the detected presence of defects in the work piece 120, such as via a text-based message, an audio message, or the like. The result of the inspection (e.g., passing, repair, discard, etc.) may be stored in the report with the other information. The inspection system 100 disclosed herein may beneficially reduce the overall rate at which work pieces are discarded during the FPI inspection process. For example, recording details about the inspection process for subsequent analysis enables the decision-making of the operator to be reviewed, which ensures accountability on the part of the operator.

Figure 6:
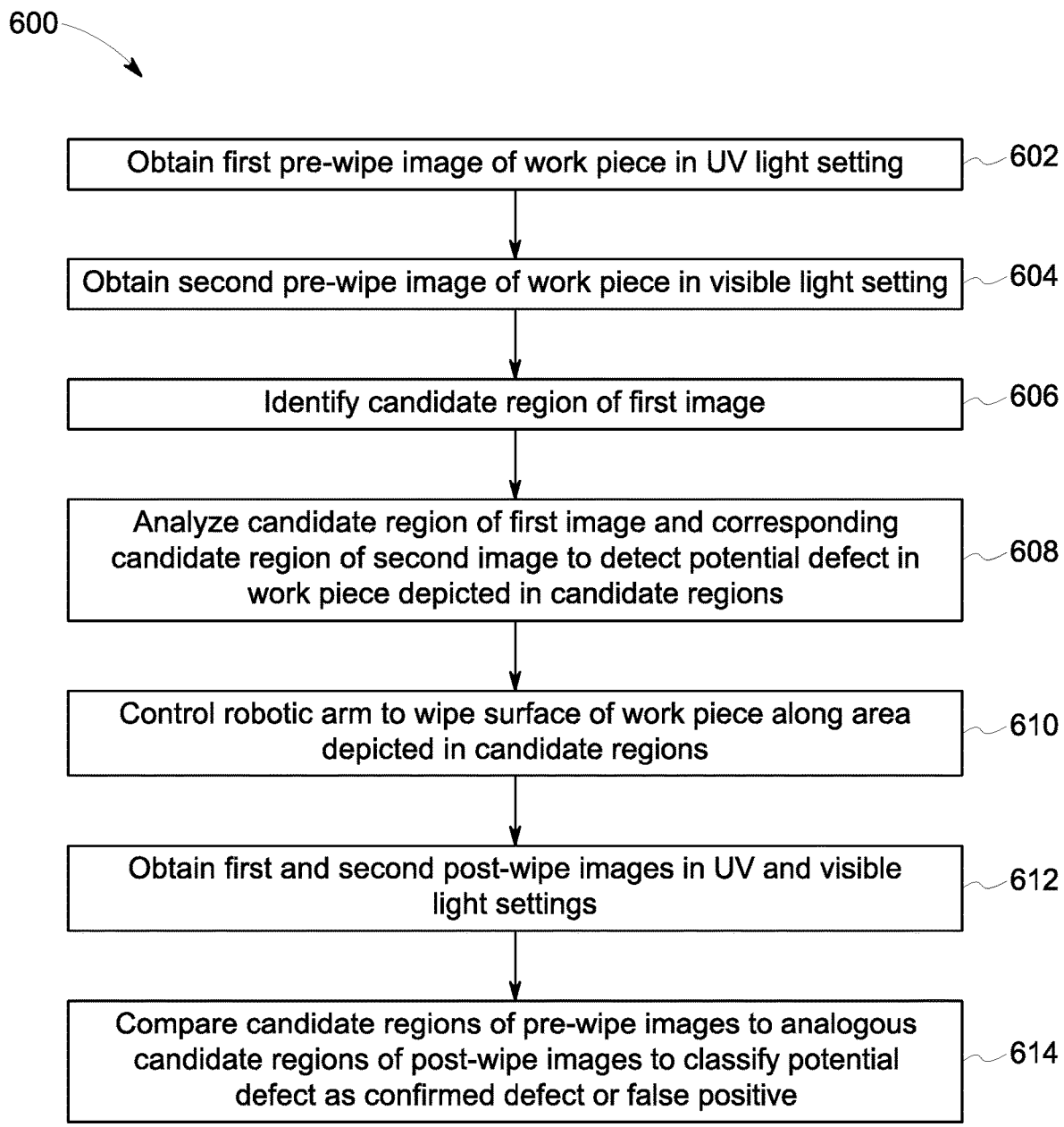
FIG. 6 is a flowchart of a method for performing FPI inspection of a work piece according to an embodiment.

FIG. 6 is a flowchart of a method 600 for performing FPI inspection of a work piece according to an embodiment. The method 600 may represent at least some of the operations performed by the control circuit 102, including the one or more processors 103 thereof, of the inspection system 100 shown in FIG. 1. The method 600 may represent an algorithm used to create (e.g., write) one or more software applications that direct operation of one or more processors 103 of the control circuit 102.

Referring to FIGS. 1 through 5, the method 600 begins at 602, at which a first image 304 of a work piece 120 is obtained in a UV light setting. The work piece 120 has a fluorescent dye thereon, although a majority of the dye may be cleansed from the work piece 120 prior to the capturing of the first image. The first image 304 is acquired via an imaging device 108 at a selected position relative to the work piece 120. The ultraviolet light setting may be provided by activating a UV light source 111 and deactivating a visible light source 110 (or maintaining the visible light source 110 in a deactivated state). The first image 304 is also referred to as a UV image 304.

At 604, a second image 302 of the work piece 120 is obtained in a visible light setting. The visible light setting may be provided by deactivating the UV light source 111 and activating the visible light source 110. The second image 302 is referred to as a visible light image 302, and is acquired by the imaging device 108 at the same selected position relative to the work piece 120 as the UV image 304. Therefore, the UV image 304 may differ from the visible light image 302 only in the lighting conditions.

At 606, a candidate region 308 of the UV image 304 is identified based on a light characteristic of one or more pixels within the candidate region 308. In an embodiment, the light characteristic is intensity and the candidate region 308 is identified by identifying a cluster 305 of pixels in the UV image 304 having respective intensities greater than an intensity threshold. The identification of the candidate region 308 may include applying a bounding box 307 around the cluster 305 of pixels in the UV image 304 to define a regular, rectangular shape of the candidate region 308.

At 608, the candidate region 308 of the UV image 304 and a corresponding candidate region 314 of the visible light image 302 are analyzed to detect a potential defect in a surface 134 of the work piece 120 depicted in the candidate regions 308, 314. The candidate region 314 of the visible light image 302 is at an analogous location as the candidate region 308 of the UV image 304. In at least one embodiment, the candidate regions 308, 314 are automatically analyzed as inputs in a forward propagation direction through layers of artificial neurons in an artificial neural network 502 comprising one or more processors. The artificial neural network 503 may be a dual branch neural network having a first branch 504 and a second branch 506. The candidate region 308 of the UV image 304 is input into the first branch 504, and the candidate region 314 of the visible light image 302 is input into the second branch 506. The artificial neural network 502 is configured to generate an output probability that the candidate regions 308, 314 depict a defect. A potential defect in the surface 134 of the work piece 120 may be detected in response to the output probability from the artificial neural network 502 exceeding a designated probability threshold, such as 0.3 (or 30%) in a non-limiting example.

At 610, a robotic arm 116 is controlled to wipe the surface 134 of the work piece 120 along an area that is depicted in the candidate regions 308, 314 of the two images 302, 304 in response to detecting a potential defect in the candidate regions 308, 314. The wiping may remove foreign debris, such as a dust and dirt, and substances such as excess dye, oil, and the like, from the work piece 120.

At 612, first and second post-wipe images are obtained of the work piece 120 in the UV and visible light settings. The post-wipe images are captured at the same position of the imaging device 108 relative to the work piece 120 as the first and second images 302, 304 captured prior to the wiping stage (referred to as pre-wipe images). The first post-wipe image is acquired in the UV light setting, and the second post-wipe image is acquired in the visible light setting.

At 614, the candidate regions 308, 314 of the pre-wipe images 302, 304 are compared to analogous candidate regions of the post-wipe images to classify the potential defect as a confirmed defect or a false positive. The comparison may be performed by examining the candidate regions 308, 314 of the pre-wipe images 302, 304 and the analogous candidate regions of the post-wipe images as inputs in a forward propagation direction through layers of artificial neurons in the artificial neural network 502. For example, the artificial neural network 502 may output a probability after examining the four candidate regions. If the probability is at or above a designated confirmation threshold, the potential defect is classified as a confirmed defect. If the probability is below the designated confirmation threshold, the potential defect is classified as a false positive. The presence of confirmed defects may cause an operator to schedule the work piece 120 for repair or may cause the operator to discard or dispose the work piece 120.

After 614, the method 600 may include redeveloping the work piece 120 by reapplying a developer on the work piece 120. The developer may be applied to an area of the surface 134 that did not bleed back. Afterwards, flow may return to 612 and another round of post-wipe images (e.g., third and fourth post-wipe images) may be obtained in the UV and visible light settings, before comparing the candidate regions of the pre-wipe images to the third and fourth post-wipe images at 614.

In one or more embodiments, an inspection system is provided that includes one or more processors configured to obtain a first image of a work piece that has a fluorescent dye thereon in an ultraviolet (UV) light setting and a second image of the work piece in a visible light setting. The work piece is illuminated with an ultraviolet light in the UV light setting to cause the fluorescent dye to emit light, and the work piece is illuminated with a visible light in the visible light setting to cause the work piece to reflect light. The first and second images are generated by one or more imaging devices in the same position relative to the work piece. The one or more processors are configured to identify a candidate region of the first image based on a light characteristic of one or more pixels within the candidate region, and to determine a corresponding candidate region of the second image that is at an analogous location as the candidate region of the first image. The one or more processors are configured to analyze both the candidate region of the first image and the corresponding candidate region of the second image to detect a potential defect on a surface of the work piece and a location of the potential defect relative to the surface of the work piece.

Optionally, the one or more processors are configured to analyze the candidate regions of the first and second images by examining the candidate regions as inputs in a forward propagation direction through layers of artificial neurons in an artificial neural network. Optionally, the artificial neural network is a dual branch neural network having a first branch and a second branch. The one or more processors input the candidate region of the first image into the first branch and input the candidate region of the second image into the second branch. Optionally, the artificial neural network is configured to generate an output probability that the candidate regions of the first and second images depict a defect. The one or more processors detect the potential defect in the surface of the work piece responsive to the output probability from the artificial neural network exceeding a designated probability threshold.

Optionally, the light characteristic is intensity, and the one or more processors are configured to identify the candidate region of the first image by identifying a cluster of pixels in the first image having respective intensities greater than an intensity threshold.

Optionally, the one or more processors are configured to identify the candidate region of the first image by applying a bounding box around a cluster of pixels in the first image.

Optionally, responsive to detecting the potential defect in the surface of the work piece along an area of the work piece depicted in the candidate regions of the first and second images, the one or more processors are further configured to control a robotic arm to wipe the surface of the work piece along the area. Optionally, the first and second images are first and second pre-wipe images, and the one or more processors are further configured to, subsequent to the robotic arm wiping the surface of the work piece, obtain first and second post-wipe images of the work piece that are generated by the one or more imaging devices in the same position relative to the work piece as the first and second pre-wipe images. The first post-wipe image is acquired in the UV light setting, and the second post-wipe image is acquired in the visible light setting. Optionally, the one or more processors are further configured to compare the candidate regions of the first and second pre-wipe images to analogous candidate regions of the first and second post-wipe images to classify the potential defect as a confirmed defect or a false positive. Optionally, the one or more processors are configured to examine the candidate regions of the first and second pre-wipe images and the analogous candidate regions of the first and second post-wipe images as inputs in a forward propagation direction through layers of artificial neurons in an artificial neural network to classify the potential defect as the confirmed defect or the false positive.

In one or more embodiments, a method is provided that includes obtaining a first image of a work piece that has a fluorescent dye thereon in an ultraviolet (UV) light setting in which the work piece is illuminated with an ultraviolet light to cause the fluorescent dye to emit light. The method includes obtaining a second image of the work piece in a visible light setting in which the work piece is illuminated by a visible light to cause the work piece to reflect light. The first and second images are generated by one or more imaging devices in the same position relative to the work piece. The method also includes identifying a candidate region of the first image based on a light characteristic of one or more pixels within the candidate region, and determining a corresponding candidate region of the second image that is at an analogous location as the candidate region of the first image. The method also includes analyzing, via one or more processors, both the candidate region of the first image and the corresponding candidate region of the second image to detect a potential defect on a surface of the work piece and a location of the potential defect relative to the surface of the work piece.

Optionally, the analyzing includes examining the candidate regions of the first and second images as inputs in a forward propagation direction through layers of artificial neurons in an artificial neural network. Optionally, the artificial neural network is a dual branch neural network having a first branch and a second branch. The candidate region of the first image is input into the first branch, and the candidate region of the second image is input into the second branch. Optionally, the artificial neural network is configured to generate an output probability that the candidate regions of the first and second images depict a defect. The method further comprises detecting the potential defect in the surface of the work piece responsive to the output probability from the artificial neural network exceeding a designated probability threshold.

Optionally, the light characteristic is intensity, and the identifying of the candidate region of the first image includes identifying a cluster of pixels in the first image having respective intensities greater than an intensity threshold.

Optionally, the identifying of the candidate region of the first image includes applying a bounding box around a cluster of pixels in the first image.

Optionally, responsive to detecting the potential defect in the surface of the work piece along an area of the work piece depicted in the candidate regions of the first and second images, the method further comprises controlling a robotic arm to wipe the surface of the work piece along the area. Optionally, the first and second images are first and second pre-wipe images. The method further comprises, subsequent to the wiping of the surface of the work piece by the robotic arm, obtaining first and second post-wipe images of the work piece that are generated by the one or more imaging devices in the same position relative to the work piece as the first and second pre-wipe images. The first post-wipe image is acquired in the UV light setting, and the second post-wipe image is acquired in the visible light setting. Optionally, the method further includes comparing the candidate regions of the first and second pre-wipe images to analogous candidate regions of the first and second post-wipe images to classify the potential defect as a confirmed defect or a false positive. Optionally, the comparing includes examining the candidate regions of the first and second pre-wipe images and the analogous candidate regions of the first and second post-wipe images as inputs in a forward propagation direction through layers of artificial neurons in an artificial neural network.

In one or more embodiments, an inspection system is provided that includes one or more processors configured to obtain a first image of a work piece in an ultraviolet (UV) light setting and a second image of the work piece in a visible light setting. The work piece has a fluorescent dye thereon. The first and second images are generated by one or more imaging devices in the same position relative to the work piece. The one or more processors are configured to identify a candidate region of the first image based on a light characteristic of one or more pixels within the candidate region, and to input the candidate region of the first image into a first branch of a dual branch neural network. The one or more processors are also configured to input a corresponding candidate region of the second image, at an analogous location as the candidate region of the first image, into a second branch of the dual branch neural network to examine the candidate regions in a forward propagation direction through layers of artificial neurons of the dual branch neural network. The one or more processors detect a potential defect in a surface of the work piece depicted in the candidate regions based on an output of the dual branch neural network.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An inspection system comprising:
one or more processors configured to obtain a first image of a work piece that has a fluorescent dye thereon in an ultraviolet (UV) light setting and a second image of the work piece in a visible light setting, the work piece being illuminated with an ultraviolet light in the UV light setting to cause the fluorescent dye to emit light and the work piece being illuminated with a visible light in the visible light setting to cause the work piece to reflect light, the first and second images being generated by one or more imaging devices in the same position relative to the work piece,
wherein the one or more processors are configured to identify a candidate region of the first image based on a light characteristic of one or more pixels within the candidate region and to determine a corresponding candidate region of the second image that is at an analogous location as the candidate region of the first image, and
wherein the one or more processors are configured to analyze both the candidate region of the first image and the corresponding candidate region of the second image by examining the candidate regions as inputs in a forward propagation direction through layers of artificial neurons in an artificial neural network, the artificial neural network configured to generate an output probability that the candidate regions of the first and second images depict a defect, and
wherein the one or more processors are configured to detect a potential defect on a surface of the work piece and a location of the potential defect relative to the surface of the work piece responsive to the output probability from the artificial neural network exceeding a designated probability threshold.

2. The inspection system of claim 1, wherein the artificial neural network is a dual branch neural network having a first branch and a second branch, wherein the one or more processors input the candidate region of the first image into the first branch and input the candidate region of the second image into the second branch.

3. The inspection system of claim 1, wherein the light characteristic is intensity and the one or more processors are configured to identify the candidate region of the first image by identifying a cluster of pixels in the first image having respective intensities greater than an intensity threshold.

4. The inspection system of claim 1, wherein the one or more processors are configured to identify the candidate region of the first image by applying a bounding box around a cluster of pixels in the first image.

5. The inspection system of claim 1, wherein, responsive to detecting the potential defect in the surface of the work piece along an area of the work piece depicted in the candidate regions of the first and second images, the one or more processors are further configured to control a robotic arm to wipe the surface of the work piece along the area.

6. The inspection system of claim 5, wherein the first and second images are first and second pre-wipe images, and the one or more processors are further configured to obtain first and second post-wipe images of the work piece subsequent to the robotic arm wiping the surface of the work piece, the first and second post-wipe images generated by the one or more imaging devices in the same position relative to the work piece as the first and second pre-wipe images, wherein the first post-wipe image is acquired in the UV light setting and the second post-wipe image is acquired in the visible light setting.

7. The inspection system of claim 6, wherein the one or more processors are configured to compare the candidate regions of the first and second pre-wipe images to analogous candidate regions of the first and second post-wipe images to classify the potential defect as a confirmed defect or a false positive.

8. The inspection system of claim 6, wherein the one or more processors are configured to examine the candidate regions of the first and second pre-wipe images and the analogous candidate regions of the first and second post-wipe images as inputs in a forward propagation direction through layers of artificial neurons in the artificial neural network or another artificial neural network to classify the potential defect as a confirmed defect or a false positive.

9. An inspection system comprising:
one or more processors configured to obtain a first pre-wipe image of a work piece that has a fluorescent dye thereon in an ultraviolet (UV) light setting and a second pre-wipe image of the work piece in a visible light setting, the work piece being illuminated with an ultraviolet light in the UV light setting to cause the fluorescent dye to emit light and the work piece being illuminated with a visible light in the visible light setting to cause the work piece to reflect light, the first and second pre-wipe images being generated by one or more imaging devices in the same position relative to the work piece,
wherein the one or more processors are configured to identify a candidate region of the first pre-wipe image based on a light characteristic of one or more pixels within the candidate region and to determine a corresponding candidate region of the second pre-wipe image that is at an analogous location as the candidate region of the first pre-wipe image,
wherein the one or more processors are configured to analyze both the candidate regions of the first and second pre-wipe images to detect a potential defect on a surface of the work piece and a location of the potential defect relative to the surface of the work piece,
wherein, responsive to detecting the potential defect, the one or more processors are further configured to control a robotic arm to wipe the surface of the work piece along an area of the work piece depicted in the candidate regions of the first and second pre-wipe images, and subsequently obtain first and second post-wipe images of the work piece that are generated by the one or more imaging devices in the same position relative to the work piece as the first and second pre-wipe images, wherein the first post-wipe image is acquired in the UV light setting and the second post-wipe image is acquired in the visible light setting.

10. The inspection system of claim 9, the one or more processors are further configured to compare the candidate regions of the first and second pre-wipe images to analogous candidate regions of the first and second post-wipe images to classify the potential defect as a confirmed defect or a false positive.

11. The inspection system of claim 10, wherein the one or more processors are configured to examine the candidate regions of the first and second pre-wipe images and the analogous candidate regions of the first and second post-wipe images as inputs in a forward propagation direction through layers of artificial neurons in an artificial neural network to classify the potential defect as the confirmed defect or the false positive.

12. The inspection system of claim 9, wherein the one or more processors are configured to analyze the candidate regions of the first and second pre-wipe images by inputting the candidate region of the first pre-wipe image into a first branch of a dual branch artificial neural network and inputting the candidate region of the second pre-wipe image into a second branch of the dual branch artificial neural network to examine the candidate regions in a forward propagation direction through layers of artificial neurons of the dual branch neural network.

13. A method comprising:
obtaining a first image of a work piece that has a fluorescent dye thereon in an ultraviolet (UV) light setting in which the work piece is illuminated with an ultraviolet light to cause the fluorescent dye to emit light;
obtaining a second image of the work piece in a visible light setting in which the work piece is illuminated by a visible light to cause the work piece to reflect light, wherein the first and second images are generated by one or more imaging devices in the same position relative to the work piece;
identifying a candidate region of the first image based on a light characteristic of one or more pixels within the candidate region;
determining a corresponding candidate region of the second image that is at an analogous location as the candidate region of the first image; and
analyzing, via one or more processors, both the candidate region of the first image and the corresponding candidate region of the second image by examining the candidate regions as inputs in a forward propagation direction through layers of artificial neurons in a dual branch artificial neural network to detect a potential defect on a surface of the work piece and a location of the potential defect relative to the surface of the work piece,
wherein the dual branch artificial neural network has a first branch and a second branch, the candidate region of the first image is input into the first branch, and the candidate region of the second image is input into the second branch.

14. The method of claim 13, wherein the dual branch artificial neural network is configured to generate an output probability that the candidate regions of the first and second images depict a defect, and the method further comprises detecting the potential defect in the surface of the work piece responsive to the output probability from the dual branch artificial neural network exceeding a designated probability threshold.

15. The method of claim 13, wherein the light characteristic is intensity and the identifying of the candidate region of the first image includes identifying a cluster of pixels in the first image having respective intensities greater than an intensity threshold.

16. The method of claim 13, wherein the identifying of the candidate region of the first image includes applying a bounding box around a cluster of pixels in the first image.

17. The method of claim 13, wherein, responsive to detecting the potential defect in the surface of the work piece along an area of the work piece depicted in the candidate regions of the first and second images, the method further comprises controlling a robotic arm to wipe the surface of the work piece along the area.

18. The method of claim 17, wherein the first and second images are first and second pre-wipe images, and the method further comprises, subsequent to the wiping of the surface of the work piece by the robotic arm, obtaining first and second post-wipe images of the work piece that are generated by the one or more imaging devices in the same position relative to the work piece as the first and second pre-wipe images, wherein the first post-wipe image is acquired in the UV light setting and the second post-wipe image is acquired in the visible light setting.

19. The method of claim 18, further comprising comparing the candidate regions of the first and second pre-wipe images to analogous candidate regions of the first and second post-wipe images to classify the potential defect as a confirmed defect or a false positive.

20. The method of claim 19, wherein the comparing includes examining the candidate regions of the first and second pre-wipe images and the analogous candidate regions of the first and second post-wipe images as inputs in a forward propagation direction through layers of artificial neurons in an artificial neural network.

21. An inspection system comprising:
one or more processors configured to obtain a first image of a work piece in an ultraviolet (UV) light setting and a second image of the work piece in a visible light setting, the work piece having a fluorescent dye thereon, the first and second images being generated by one or more imaging devices in the same position relative to the work piece,
wherein the one or more processors are configured to identify a candidate region of the first image based on a light characteristic of one or more pixels within the candidate region, and to input the candidate region of the first image into a first branch of a dual branch neural network, and
wherein the one or more processors are configured to input a corresponding candidate region of the second image, at an analogous location as the candidate region of the first image, into a second branch of the dual branch neural network to examine the candidate regions in a forward propagation direction through layers of artificial neurons of the dual branch neural network, the one or more processors detecting a potential defect in a surface of the work piece depicted in the candidate regions based on an output of the dual branch neural network.

* * * * *